(12) United States Patent  
Kawakami et al.

(10) Patent No.: US 12,027,702 B2  
(45) Date of Patent: *Jul. 2, 2024

(54) POSITIVE ELECTRODE ACTIVE MATERIAL OF POWER STORAGE DEVICE, POWER STORAGE DEVICE, ELECTRICALLY PROPELLED VEHICLE, AND METHOD FOR MANUFACTURING POWER STORAGE

(71) Applicant: SEMICONDUCTOR ENERGY LABORATORY CO., LTD., Atsugi (JP)

(72) Inventors: Takahiro Kawakami, Kanagawa (JP); Masaki Yamakaji, Kanagawa (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 712 days.

This patent is subject to a terminal disclaimer.

(21) Appl. No.: 17/160,735

(22) Filed: Jan. 28, 2021

(65) Prior Publication Data

US 2021/0151758 A1    May 20, 2021

Related U.S. Application Data

(63) Continuation of application No. 16/261,618, filed on Jan. 30, 2019, now Pat. No. 10,916,774, which is a (Continued)

(30) Foreign Application Priority Data

Apr. 28, 2010 (JP) .................... 2010-103832  
Apr. 28, 2010 (JP) .................... 2010-104027  
Apr. 28, 2010 (JP) .................... 2010-104082

(51) Int. Cl.  
*H01M 4/58* (2010.01)  
*B60L 50/64* (2019.01)  
(Continued)

(52) U.S. Cl.  
CPC ............ *H01M 4/5825* (2013.01); *B60L 50/64* (2019.02); *B82Y 30/00* (2013.01); *H01M 4/136* (2013.01);  
(Continued)

(58) Field of Classification Search  
None  
See application file for complete search history.

(56) References Cited

U.S. PATENT DOCUMENTS 6,440,606 B1    8/2002  Yoshizawa et al.  
6,645,452 B1    11/2003 Barker et al.  
(Continued)

FOREIGN PATENT DOCUMENTS

CA    2344903    10/2001  
CA    2796903    10/2001  
(Continued)

OTHER PUBLICATIONS

Kang.B et al., "Battery Materials for Ultrafast Charging and Discharging", Nature, Mar. 12, 2009, vol. 458, No. 7235, pp. 190-193.  
(Continued)

*Primary Examiner* — Maria Laios  
(74) *Attorney, Agent, or Firm* — NIXON PEABODY LLP; Jeffrey L. Costellia

(57) ABSTRACT

An object is to improve the characteristics of a power storage device such as a charging and discharging rate or a charge and discharge capacity. The grain size of particles of a positive electrode active material is nano-sized so that a surface area per unit mass of the active material is increased. Specifically, the grain size is set to greater than or equal to 10 nm and less than or equal to 100 nm, preferably greater than or equal to 20 nm and less than or equal to 60 nm. Alternatively, the surface area per unit mass is set to 10 $m^2/g$ or more, preferably 20 $m^2/g$ or more, further, the crystallin- (Continued)

ity of the active material is increased by setting an XRD half width to greater than or equal to 0.12° and less than 0.17°, preferably greater than or equal to 0.13° and less than 0.16°.

10 Claims, 22 Drawing Sheets

Related U.S. Application Data continuation of application No. 15/856,951, filed on Dec. 28, 2017, now Pat. No. 10,224,548, which is a continuation of application No. 15/091,770, filed on Apr. 6, 2016, now Pat. No. 9,899,678, which is a continuation of application No. 13/093,050, filed on Apr. 25, 2011, now Pat. No. 9,318,741.

(51) Int. Cl.
 *B82Y 30/00* (2011.01)
 *H01M 4/02* (2006.01)
 *H01M 4/136* (2010.01)
 *H01M 4/1397* (2010.01)
 *H01M 10/04* (2006.01)
 *H01M 10/0525* (2010.01)

(52) U.S. Cl.
 CPC ..... *H01M 4/1397* (2013.01); *H01M 10/0436* (2013.01); *H01M 10/0525* (2013.01); *H01M 2004/021* (2013.01); *H01M 2004/028* (2013.01); *H01M 2220/20* (2013.01); *Y02E 60/10* (2013.01); *Y02P 70/50* (2015.11); *Y02T 10/70* (2013.01)

(56) References Cited

U.S. PATENT DOCUMENTS

| | | | |
|---|---|---|---|
| 6,730,434 | B1 | 5/2004 | Kawakami et al. |
| 6,749,967 | B2 | 6/2004 | Li et al. |
| 6,855,273 | B2 | 2/2005 | Ravet et al. |
| 6,890,510 | B2 | 5/2005 | Spitler et al. |
| 6,962,666 | B2 | 11/2005 | Ravet et al. |
| 7,344,659 | B2 | 3/2008 | Ravet et al. |
| 7,378,192 | B2 | 5/2008 | Yoshizawa et al. |
| 7,582,383 | B2 | 9/2009 | Kasai et al. |
| 7,799,301 | B2 | 9/2010 | Kajiya et al. |
| 7,815,819 | B2 | 10/2010 | Ravet et al. |
| 7,964,118 | B2 | 6/2011 | Iizuka et al. |
| 8,173,049 | B2 | 5/2012 | Ravet et al. |
| 8,257,616 | B2 | 9/2012 | Ravet et al. |
| 8,349,217 | B2 | 1/2013 | Yamada et al. |
| 8,426,061 | B2 | 4/2013 | Nesper et al. |
| 8,506,851 | B2 | 8/2013 | Ravet et al. |
| 8,506,852 | B2 | 8/2013 | Ravet et al. |
| 8,795,894 | B2 | 8/2014 | Sakai et al. |
| 8,821,763 | B2 | 9/2014 | Sano et al. |
| 8,932,762 | B2 | 1/2015 | Sano et al. |
| 8,936,871 | B2 | 1/2015 | Sano et al. |
| 8,980,126 | B2 | 3/2015 | Kawakami et al. |
| 9,318,741 | B2 | 4/2016 | Kawakami et al. |
| 9,331,329 | B2 | 5/2016 | Choy et al. |
| 9,761,867 | B2 | 9/2017 | Nesper et al. |
| 9,899,678 | B2 * | 2/2018 | Kawakami ............ B82Y 30/00 |
| 2001/0055718 | A1 | 12/2001 | Li et al. |
| 2002/0130323 | A1 | 9/2002 | Miyanaga et al. |
| 2002/0195591 | A1 | 12/2002 | Ravet et al. |
| 2004/0140458 | A1 | 7/2004 | Ravet et al. |
| 2006/0060827 | A1 | 3/2006 | Ravet et al. |
| 2006/0147365 | A1 | 7/2006 | Okada et al. |
| 2007/0172732 | A1 | 7/2007 | Jung et al. |
| 2007/0286796 | A1 | 12/2007 | Koper et al. |
| 2008/0257721 | A1 | 10/2008 | Ravet et al. |
| 2010/0078591 | A1 | 4/2010 | Sano et al. |
| 2010/0133467 | A1 | 6/2010 | Ikegawa |
| 2010/0148114 | A1 | 6/2010 | Iizuka et al. |
| 2011/0086273 | A1 | 4/2011 | Ravet et al. |
| 2011/0091772 | A1 | 4/2011 | Mishima et al. |
| 2011/0097479 | A1 | 4/2011 | Ravet et al. |
| 2011/0229764 | A1 | 9/2011 | Kawakami et al. |
| 2011/0269022 | A1 | 11/2011 | Kawakami et al. |
| 2012/0183839 | A1 | 7/2012 | Yuasa et al. |
| 2012/0213919 | A1 | 8/2012 | Ravet et al. |
| 2012/0214072 | A1 | 8/2012 | Ravet et al. |
| 2012/0237425 | A1 | 9/2012 | Nishio et al. |
| 2013/0216902 | A1 | 8/2013 | Choy et al. |
| 2013/0302673 | A1 | 11/2013 | Ravet et al. |
| 2014/0298646 | A1 | 10/2014 | Ikegawa |
| 2015/0132660 | A1 | 5/2015 | Ravet et al. |
| 2015/0162612 | A1 | 6/2015 | Kawakami et al. |
| 2016/0218367 | A1 | 7/2016 | Kawakami et al. |
| 2018/0040877 | A1 | 2/2018 | Ravet et al. |

FOREIGN PATENT DOCUMENTS

| | | |
|---|---|---|
| CN | 001322023 A | 11/2001 |
| CN | 101714623 A | 5/2010 |
| CN | 102893432 A | 1/2013 |
| EP | 1049182 A | 11/2000 |
| EP | 1134826 A | 9/2001 |
| EP | 1150367 A | 10/2001 |
| EP | 1569289 A | 8/2005 |
| EP | 1796189 A | 6/2007 |
| EP | 1936721 A | 6/2008 |
| EP | 2166600 A | 3/2010 |
| EP | 2228854 A | 9/2010 |
| EP | 2228855 A | 9/2010 |
| EP | 2239806 A | 10/2010 |
| EP | 2476647 A | 7/2012 |
| EP | 2562857 A | 2/2013 |
| EP | 2985822 A | 2/2016 |
| JP | 2001-015111 A | 1/2001 |
| JP | 2001-196059 A | 7/2001 |
| JP | 2001-266882 A | 9/2001 |
| JP | 2001-307732 A | 11/2001 |
| JP | 2003-292309 A | 10/2003 |
| JP | 2004-319390 A | 11/2004 |
| JP | 2005-190882 A | 7/2005 |
| JP | 2006-004631 A | 1/2006 |
| JP | 2007-335325 A | 12/2007 |
| JP | 2008-041577 A | 2/2008 |
| JP | 2008-105943 A | 5/2008 |
| JP | 2008-123814 A | 5/2008 |
| JP | 2008159495 A * | 7/2008 |
| JP | 2008-186807 A | 8/2008 |
| JP | 2008-257894 A | 10/2008 |
| JP | 2009-029670 A | 2/2009 |
| JP | 2009-043546 A | 2/2009 |
| JP | 2009-206085 A | 9/2009 |
| JP | 2009-263176 A | 11/2009 |
| JP | 2009-540510 | 11/2009 |
| JP | 2009-301813 A | 12/2009 |
| JP | 2010-086658 A | 4/2010 |
| JP | 2010-086777 A | 4/2010 |
| JP | 2010-086778 A | 4/2010 |
| JP | 2010-219048 A | 9/2010 |
| JP | 2011-076820 A | 4/2011 |
| JP | 2011-213587 A | 10/2011 |
| JP | 2011-249324 A | 12/2011 |
| JP | 2012-099471 A | 5/2012 |
| JP | 2013-525975 | 6/2013 |
| JP | 5344452 | 11/2013 |
| JP | 2014-017268 A | 1/2014 |
| JP | 2014-026989 A | 2/2014 |
| JP | 2015-099790 A | 5/2015 |
| JP | 2015-122327 A | 7/2015 |
| JP | 2016-106370 A | 6/2016 |
| JP | 2017-139240 A | 8/2017 |
| JP | 2018-018828 A | 2/2018 |
| KR | 10-0809854 | 3/2008 |
| KR | 2008-0047537 A | 5/2008 |
| KR | 2011-0117619 A | 10/2011 |
| KR | 10-1358515 | 2/2014 |
| TW | 525313 | 3/2003 |

(56) References Cited

FOREIGN PATENT DOCUMENTS

| WO | WO-2003/008334 | 1/2003 |
|----|----------------|--------|
| WO | WO-2006/049001 | 5/2006 |
| WO | WO-2007/034821 | 3/2007 |
| WO | WO-2007/143700 | 12/2007 |
| WO | WO-2008/105490 | 9/2008 |
| WO | WO-2008/123311 | 10/2008 |
| WO | WO-2009/122686 | 10/2009 |
| WO | WO-2011/030786 | 3/2011 |
| WO | WO-2011/039921 | 4/2011 |
| WO | WO-2011/132931 | 10/2011 |

OTHER PUBLICATIONS

Yasutomi.M et al., "Synthesis and Electrochemical Properties of Li2—xM(SiO4)1-x(PO4)x(M=Fe,Mn) Positive Active Materials by Hydrothermal Process for Li-ion Cells", GS Yuasa Technical Report, Jun. 26, 2009, vol. 6, No. 1, pp. 21-26.

Huang.X et al., "Electrochemical performance of LiFePO4 nanorods obtained from hydrothermal process", Materials Characterization, Jul. 1, 2010, vol. 61, No. 7, pp. 720-725, Elsevier.

\* cited by examiner

FIG. 9A
| sample | baking temperature (°C) | baking time (hour) | glucose (wt%) | surface erea (m²/g) | XRD half width (°) | rate characteristic (%) | discharge capacity (mAh/g) |
|---|---|---|---|---|---|---|---|
| A | 600 | 10 | 15 | 35.0 | 0.168 | 80.0 | 151.4 |
| B | 600 | 10 | 10 | 25.3 | 0.131 | 84.4 | 158.6 |
| C | 600 | 10 | 5 | 24.1 | 0.160 | 86.3 | 152.8 |
| D | 600 | 5 | 10 | 26.4 | 0.155 | 88.2 | 153.1 |
| E | 600 | 3 | 10 | 27.3 | 0.150 | 89.5 | 155.3 |
| F | 500 | 10 | 10 | 30.0 | 0.171 | 63.5 | 146.3 |
| G | 400 | 10 | 10 | 35.4 | 0.194 | 63.5 | 138.6 |
FIG. 9B
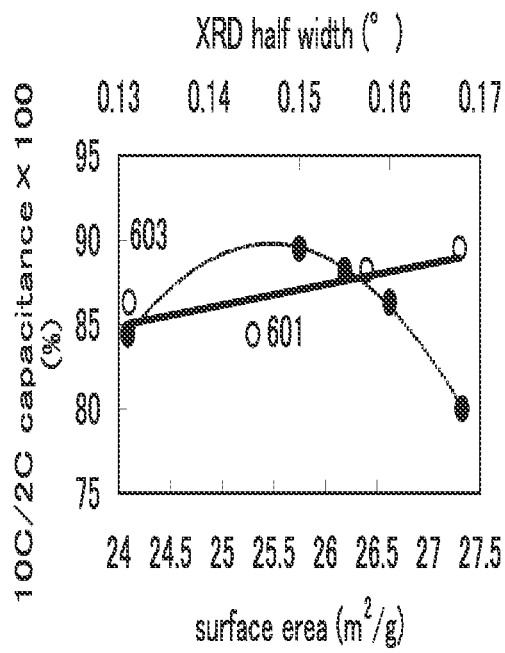
FIG. 9C
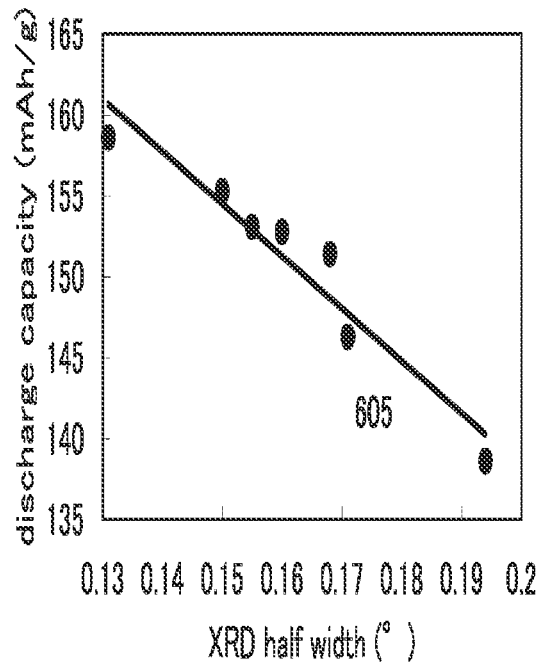

POSITIVE ELECTRODE ACTIVE MATERIAL OF POWER STORAGE DEVICE, POWER STORAGE DEVICE, ELECTRICALLY PROPELLED VEHICLE, AND METHOD FOR MANUFACTURING POWER STORAGE

BACKGROUND OF THE INVENTION

1. Field of the Invention

The technical field of the present invention rerates to a power storage device and a manufacturing method thereof.

2. Description of the Related Art

With an increase in concern for the environmental issues, energy storage devices such as secondary batteries and electric double layer capacitors used for power supply for hybrid vehicles have been actively developed. As the energy storage devices, a lithium ion battery and a lithium ion capacitor having high energy performance have attracted attention. The lithium ion battery, which is compact but can store large electricity has been already mounted on a portable information terminal such as a mobile phone or a notebook personal computer, and has helped miniaturization of products.

The secondary battery and the electric double layer capacitor have a structure in which an electrolyte is provided between a positive electrode and a negative electrode. It is known that each of the positive electrode and negative electrode includes a collector and an active material provided over the collector. For example, in a lithium ion battery, a material capable of injection and extraction of lithium ions is used in each electrode as an active material, and an electrolyte is interposed between the electrodes.

A lithium oxide and the like are known as a positive electrode active material of a lithium ion battery (see Patent Documents 1 and 2).

REFERENCE

Patent Document

[Patent Document 1] Japanese Published Patent Application No. 2008-257894
[Patent Document 2] PCT International Publication No. 2006/049001

SUMMARY OF THE INVENTION

In a lithium oxide disclosed in Patent Document 1, insertion and extraction of a lithium ion can be performed and change in a crystal structure is hardly induced by insertion and extraction of a lithium ion; therefore, the lithium oxide is expected as a positive electrode active material. However, the conductivity of a lithium oxide is low and the characteristics thereof have not been improved.

In view of the above problems, an object of one embodiment of the present invention is to improve the characteristics of a power storage device.

According to one embodiment of the disclosed invention, in a positive electrode of a power storage device, a diffusion path of a reactive material (e.g., lithium ions) is increased by nano-sizing a grain size of an active material.

Alternatively, a diffusion path of a reactive material (e.g., lithium ions) is increased by increasing the surface area per unit mass of an active material as much as possible. Note that the surface area per unit mass of an active material is increased when surface roughness of the active material is increased by aggregate of particles having small grain sizes.

Further, in one embodiment of the disclosed invention, a lithium oxide is used as a positive electrode active material of a power storage device.

As the lithium oxide, a material represented by a general formula $Li_{2-x}MSiO_4$ and satisfying conditions (I) and (II) below is used.

(I) x is a value changing within a range $0 \leq x \leq 2$, due to insertion and extraction of a lithium ion during charging and discharging.
(II) M is one or more transition metal elements selected from iron (Fe), nickel (Ni), manganese (Mn), and cobalt (Co).

In a material represented by the general formula $Li_{(2-x)}MSiO_4$, the highest ratio of lithium atoms to the other metal atoms (M atoms) is 2:1 (molar ratio). Therefore, per one composition, the largest number of lithium ions (a reaction material) which can be inserted and extracted is two. When such a material is used as a positive electrode active material, higher capacitance can be obtained and the characteristics of a power storage device can be improved.

In one embodiment of the disclosed invention, an active material supported by a carbon material (which is also referred to as a carbon-coated material) is used in a positive electrode. By utilizing the high conductivity of the carbon material, the internal resistance of a power storage device is reduced.

One embodiment of the present invention is a positive electrode active material of a power storage device, which has a grain size of greater than or equal to 10 nm and less than or equal to 100 nm, a surface area of 10 $m^2/g$ or more, and an X-ray diffraction half width of greater than or equal to 0.12° and less than 0.17°.

Another embodiment of the present invention is a positive electrode active material of a power storage device, which has a surface area of 10 $m^2/g$ or more, and an X-ray diffraction half width of greater than or equal to 0.12° and less than 0.17°.

Another embodiment of the present invention is a positive electrode active material of a power storage device, which has a grain size of greater than or equal to 10 nm and less than or equal to 100 nm, and an X-ray diffraction half width of greater than or equal to 0.12° and less than 0.17°.

Another embodiment of the present invention is a positive electrode active material of a power storage device, which has a grain size of greater than or equal to 10 nm and less than or equal to 100 nm.

Another embodiment of the present invention is a positive electrode active material of a power storage device, which has a surface area of 10 $m^2/g$, or more.

Another embodiment of the present invention is a power storage device including a positive electrode, a negative electrode, and an electrolyte provided between the positive electrode and the negative electrode. Here, an active material provided in the positive electrode has a grain size of greater than or equal to 10 nm and less than or equal to 100 nm, a surface area of 10 $m^2/g$ or more, and an X-ray diffraction half width of greater than or equal to 0.12° and less than 0.17°.

Further, it is preferable that the above active material be represented by $Li_{(2-x)}MSiO_4$ and satisfy (I) and (II) below.
(I) x is a value changing within a range $0 \leq x \leq 2$, due to insertion and extraction of a lithium ion during charging and discharging.
(II) M is one or more transition metal elements selected from iron, nickel, manganese, and cobalt.

Further, it is preferable that the above active material satisfy at least one of (III), (IV), (V), and (VI) below.
(III) a crystal structure thereof belongs to the space group P1211.
(IV) a crystal structure thereof belongs to the space group Pmn21.
(V) a crystal structure thereof belongs to the space group P121/n1.
(VI) a crystal structure thereof belongs to the space group Pbn21.

Further, it is preferable that the above active material be represented by $Li_{(2x)}Fe_sNi_uSiO_4$ and satisfy (I) and (VIII) below.
(I) x is a value changing within a range $0 \le x \le 2$, due to insertion and extraction of a lithium ion during charging and discharging.
(VIII) $s+u=1, 0 \le s \le 1$, and $0 \le u \le 1$ are satisfied.

Further, it is preferable that the above active material be represented by $Li_{(2-x)}Fe_sMn_tNi_uSiO_4$ and satisfy (I) and (IX) below.
(I) x is a value changing within a range $0 \le x \le 2$, due to insertion and extraction of a lithium ion during charging and discharging.
(IX) $s+t+u=1$, $0 \le s \le 1$, $0 \le t \le 1$, and $0 \le u \le 1$ are satisfied.

A surface of the above active material may be supported by a carbon material.

Another embodiment of the present invention is a manufacturing method of a power storage device including a step of forming a positive electrode and a step of forming a negative electrode facing the positive electrode with an electrolyte provided therebetween. The positive electrode is formed by a method including the following steps: a step of mixing raw materials to be an active material, so that a mixture is formed; a step of performing first grinding on the mixture; a step of performing first baking on the mixture; a step of performing second grinding on the mixture; a step of adding saccharide to the mixture, so that a surface of the mixture is supported by a carbon material; and a step of performing second baking on the mixture at a higher temperature than the first baking. Here, the active material has a grain size of greater than or equal to 10 nm and less than or equal to 100 nm, a surface area of 10 m²/g or more, and an X-ray diffraction half width of greater than or equal to 0.12° and less than 0.17°.

Another embodiment of the present invention is an electrically propelled vehicle which is provided with the above-described power storage device.

By microparticulating a positive electrode active material, a diffusion path of a reactive material can be increased. Thus, a diffusion rate of the reactive material and a charging and discharging rate of a power storage device can be higher. In other words, the characteristics of the power storage device can be improved.

In a material represented by the general formula the highest ratio of lithium atoms to the other metal atoms (M atoms) is 2:1 (molar ratio). Therefore, per one composition, the largest number of lithium ions (a reaction material) which can be inserted and extracted is two. When such a material is used as a positive electrode active material, higher capacitance can be obtained and the characteristics of a power storage device can be improved.

When a surface of an active material is supported by a carbon material with high conductivity, the internal resistance of a storage device can be reduced. Therefore, higher voltage can be obtained, which results in higher discharge capacity. In other words, the characteristics of the power storage device can be improved.

Further, when microparticulation, application of a material represented by the general formula $Li_{(2-x)}MSiO_4$, and support by a carbon material are performed in combination, the characteristics of a power storage device can be significantly improved.

BRIEF DESCRIPTION OF THE DRAWINGS

In the accompanying drawings:
FIGS. 9A to 9C are a table and graphs each showing an example of the characteristics of a power storage device.

DETAILED DESCRIPTION OF THE INVENTION

Figure 1A:
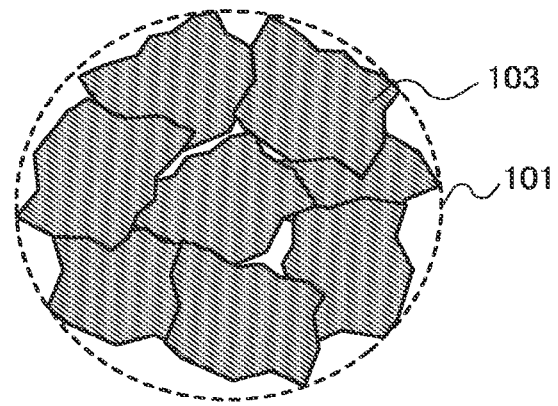
FIGS. 1A and 1B are diagrams each illustrating an example of an active material.

Hereinafter, embodiments will be described in detail with reference to the accompanying drawings. However, since embodiments described below can be embodied in many different modes, it is easily understood by those skilled in the art that the mode and the detail can be variously changed without departing from the spirit and the scope of the present invention. Therefore, the disclosed invention is not interpreted as being limited to the description of the embodiments below. In the drawings for explaining the embodiments, the same parts or parts having a similar function are denoted by the same reference numerals, and description of such parts is not repeated.

Embodiment 1

In this embodiment, a positive electrode active material of a power storage device is described.

A material to/from which a reactive material (e.g., lithium ions) can be inserted and extracted is used in a power storage device and thus charging and discharging can be performed.

A primary requisite for an excellent power storage device is a high charging and discharging rate.

In one embodiment of the present invention, the grain size of particles of a positive electrode active material is nano-sized in order to increase a charging and discharging rate. Alternatively, the surface area per unit mass of the positive electrode active material is increased.

Figure 1B:
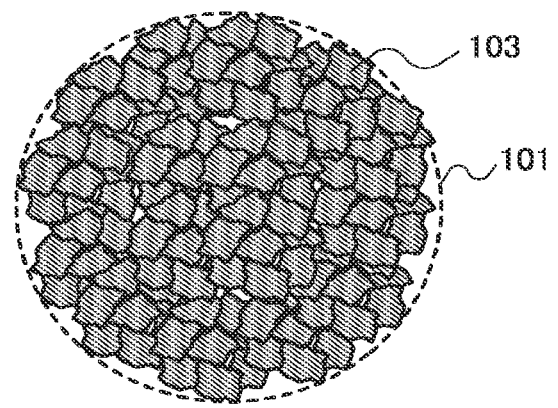

In FIGS. 1A and 1B, examples of a unit mass of an active material 101 in which particles 103 are included are illustrated. FIG. 1A illustrates the case where the particle 103 has large grain sizes and FIG. 1B illustrates the case where the particle 103 has small grain sizes.

In FIG. 1B, as compared to FIG. 1A, the grain size of the particle 103 is smaller and the number of the particles 103 included in a unit mass of the active material 101 is larger. By increasing the number of the particles 103, a diffusion path of a reactive material (e.g., lithium ions) in the active material is increased. Thus, a diffusion rate of the reactive material and a charging and discharging rate of a power storage device can be higher. Specifically, the grain size of the particle is set to greater than or equal to 10 nm and less than or equal to 100 nm, preferably greater than or equal to 20 nm and less than or equal to 60 nm.

The active material 101 in FIG. 1B has a rougher surface than the active material 101 in FIG. 1A and thus has a larger surface area per unit mass. By increasing the surface area, a diffusion path of the reactive material in the active material is increased. Thus, a diffusion rate of the reactive material and a charging and discharging rate of a power storage device can be higher. Specifically, the surface area per unit mass is set to 10 $m^2/g$ or more, preferably 20 $m^2/g$ or more. Note that when the grain size of the particle 103 is reduced, the surface area per unit mass of the active material 101 is increased.

Note that the grain size means a length in a longitudinal direction of the particle 103, and an average grain size of the particles included in a unit mass of the active material is referred to as the grain size. Further, the surface area here is measured by a BET method. Note also that a reduction in the grain size of the particles of the active material or an increase in the surface area per unit mass of the active material is also referred to as microparticulation.

Figure 2:
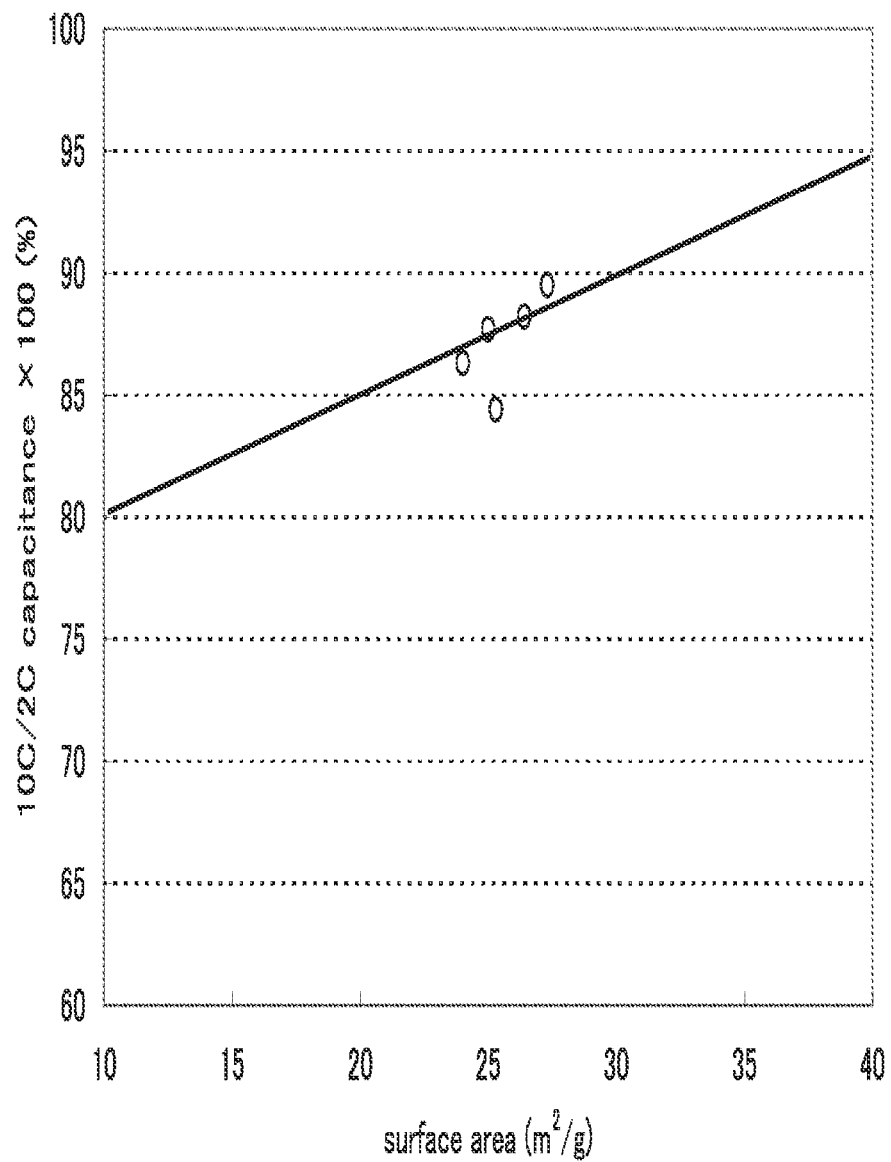
FIG. 2 is a graph showing an example of the characteristics of a power storage device.

In FIG. 2, a relation between the surface area per unit mass of an active material and rate characteristics in the case where a lithium oxide is used as a positive electrode active material is shown. The horizontal axis indicates a surface area per unit mass ($m^2/g$) of the active material and the vertical axis indicates rate characteristics.

Here, the rate characteristics which are indicated by the vertical axis are explained. Performing discharging once in an hour is expressed as 1 C. Performing discharging n times in an hour is expressed as n C; in other words, one discharging is performed in 1/n hour. Thus, in FIG. 2, it is shown that as 10 C/2 C capacitance in the vertical axis becomes higher, a charging and discharging rate can be higher. Note that 10 C/2 C capacitance means discharge capacity in the case where a discharge rate is 10 C with respect to discharge capacity in the case where a discharge rate is 2 C, and the vertical axis indicates the percentage.

As shown in FIG. 2, by increasing the surface area, the rate characteristics can be improved. Note that the rate characteristics change linearly. This is because a diffusion path of lithium ions is increased when the surface area becomes larger. Specifically, when the surface area is 10 $m^2/g$ or more, the rate characteristics can be 80% or more. Further, when the surface area is 20 $m^2/g$ or more, the rate characteristics can be 85% or more. According to FIG. 2, the rate characteristics are favorable when the surface area is at least in a range of greater than or equal to 10 $m^2/g$ and less than or equal to 40 $m^2/g$, typically greater than or equal to 24 $m^2/g$ and less than or equal to 27.5 $m^2/g$. Note that the rate characteristics of 80% or more can be seen as favorable rate characteristics.

Alternatively, the rate characteristics can be improved by reducing the grain size because a larger surface area results from a smaller grain size. The grain size is preferably greater than or equal to 10 nm and less than or equal to 100 nm (further preferably greater than or equal to 20 nm and less than or equal to 60 nm).

As described above, by microparticulating an active material, a diffusion path of a reactive material can be increased and a power storage device with a high charging and discharging rate can be obtained.

Another requisite for an excellent power storage device is high discharge capacity.

In one embodiment of the present invention, the crystallinity of an active material is increased (also referred to as crystallinity enhancement) in order to increase discharge capacity.

Figure 3:
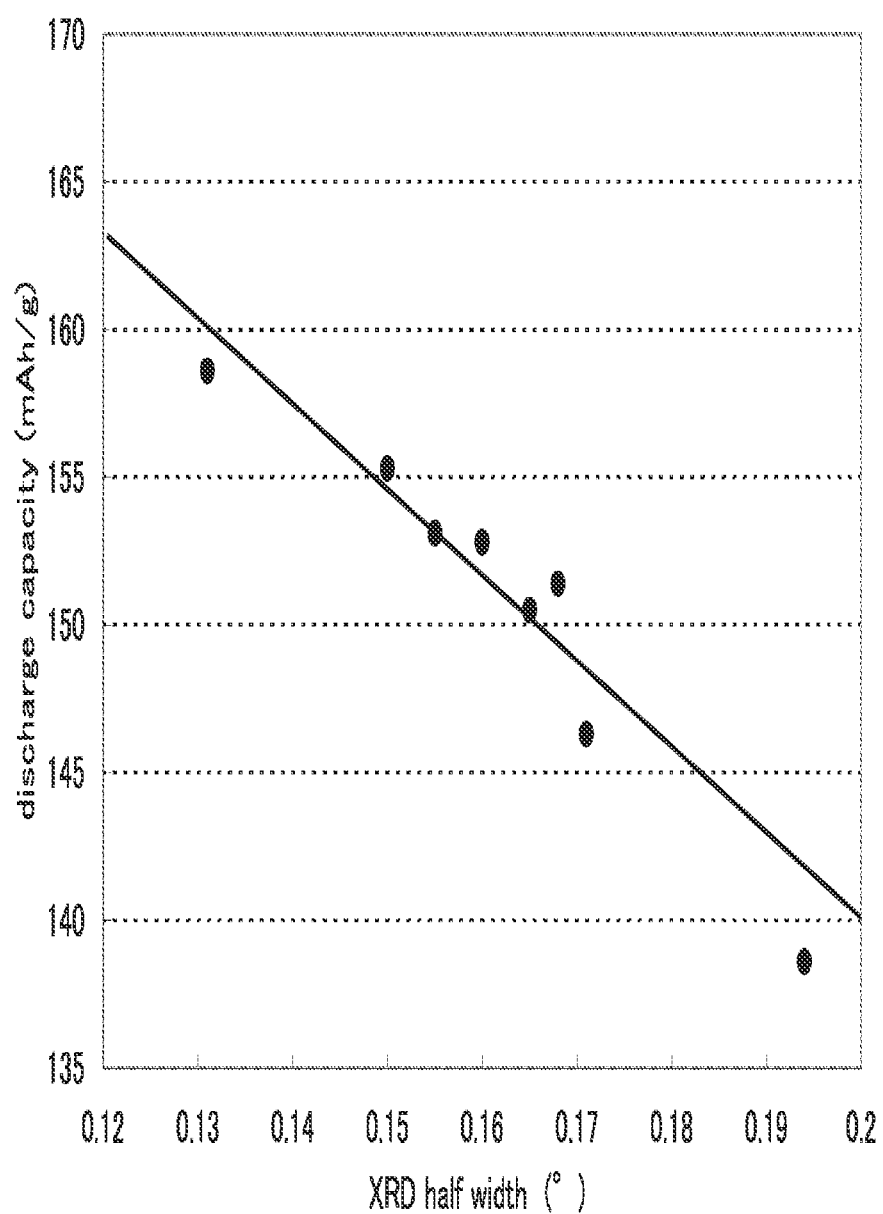
FIG. 3 is a graph showing an example of the characteristics of a power storage device.

In FIG. 3, a relation between the crystallinity of an active material and discharge capacity in the case where a lithium oxide is used as a positive electrode active material is shown. The horizontal axis indicates an X-ray diffraction half width (°) of the active material and the vertical axis indicates discharge capacity (mAh/g). The smaller the X-ray diffraction half width (a half width of an X-ray diffraction peak) is, the higher the crystallinity is. Note also that the unit "°" indicates a degree of an angle.

As shown in FIG. 3, when the X-ray diffraction half width is small, the discharge capacity is high. That is, when the crystallinity is high, the discharge capacity can be high. The discharge capacity changes linearly. When the X-ray diffraction half width is set to less than 0.2°, specifically, the discharge capacity can be extremely high. In FIG. 3, it is shown that the discharge capacity is high when the X-ray diffraction half width is at least in a range of greater than or equal to 0.12° and less than or equal to 0.2°.

As described above, by increasing the crystallinity of an active material, a power storage device with high discharge capacity can be obtained.

Another requisite for an excellent power storage device is having both a high charging and discharging rate and high discharge capacity.

In one embodiment of the present invention, an active material is microparticulated and the crystallinity of the active material is also improved in order to achieve both a high charging and discharging rate and high discharge capacity.

Figure 4:
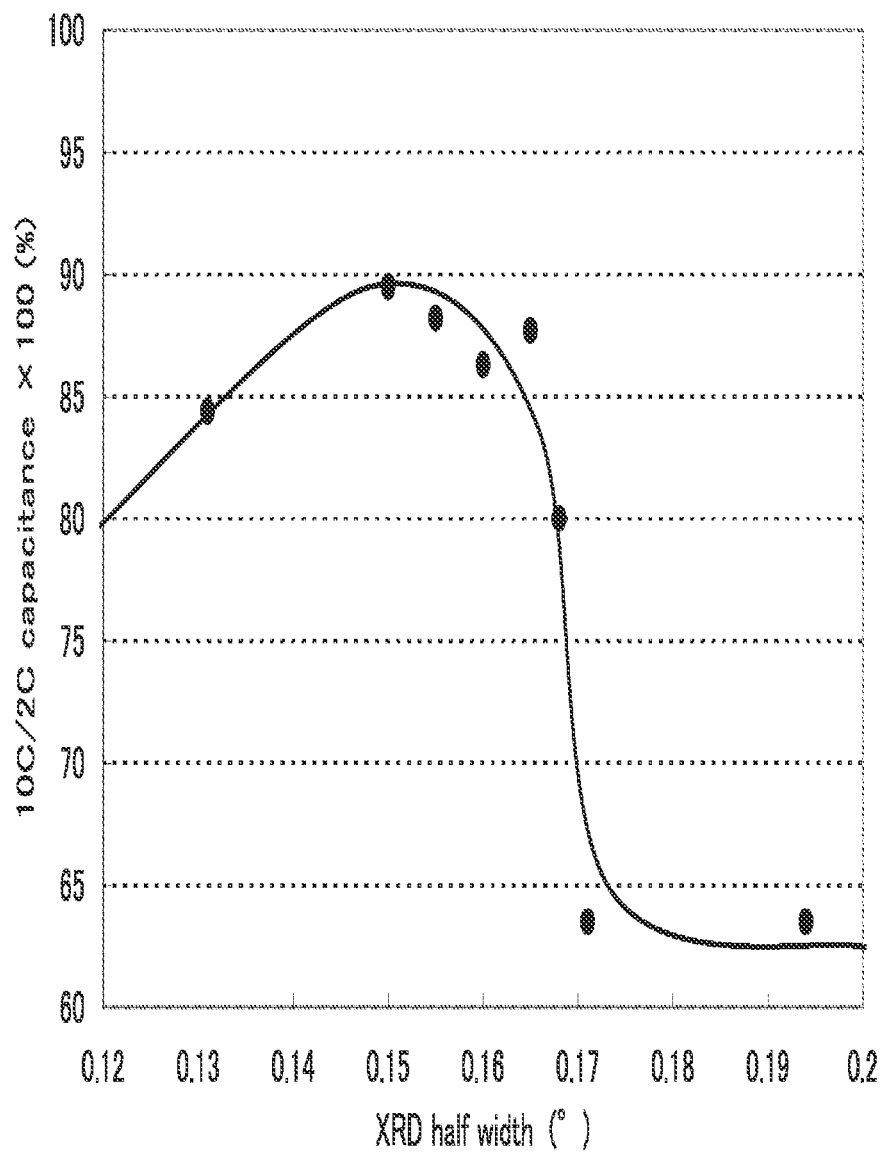
FIG. 4 is a graph showing an example of the characteristics of a power storage device.

In FIG. 4, a relation between the crystallinity of an active material and rate characteristics is shown. The horizontal axis indicates an X-ray diffraction half width (°), which shows the crystallinity. The vertical axis indicates rate characteristics, which are already explained above.

As shown in FIG. 4, by decreasing the X-ray diffraction half width, the rate characteristics can be improved. Note that when the X-ray diffraction half width is 0.15°, the maximum value of the rate characteristics is obtained. That means the existence of the maximum value of the crystallinity with respect to the rate characteristics.

When the crystallinity is too low, carrier ions are trapped in grain boundaries between the particles, whereby the mobility of carrier ions becomes low and thus the rate characteristics are reduced. On the other hand, when the crystallinity is too high, it takes time for carrier ions included in one particle to come out and thus the rate characteristics are reduced.

According to FIG. 4, when the X-ray diffraction half width is set to greater than or equal to 0.12° and less than 0.17°, the charging and discharging rate can be higher (the rate characteristics of 80% or more). Further, when the X-ray diffraction half width is set to greater than or equal to 0.13° and less than 0.16°, the charging and discharging rate can be higher (the rate characteristics of 85% or more).

Thus, according to FIG. 2, FIG. 3, and FIG. 4, a power storage device with a high charging and discharging rate (the rate characteristics of 80% or more) and high discharge capacity can be obtained by setting the surface area of the active material to be 10 $m^2/g$ or more and the X-ray diffraction half width to be greater than or equal to 0.12° and less than 0.17°. A power storage device with a higher charging and discharging rare (the rate characteristics of 85% or more) and higher discharge capacity can be obtained by setting the surface area of the active material to be 20 $m^2/g$ or more and the X-ray diffraction half width to be greater than or equal to 0.13° and less than 0.16°.

As described above, a high charging and discharging rate and high discharge capacity can be obtained by microparticulating an active material and increasing the crystallinity thereof.

Examples of a method for microparticulation or crystallinity enhancement include (1) mixing of materials, (2) baking of a material, and (3) carbon coating of a material. Their details will be described below. In the case described below, lithium iron phosphate ($LiFePO_4$) of an olivine structure is formed as an example of an active material.

In the first method, microparticulation or crystallinity enhancement is performed by mixing materials (raw materials).

First of all, as raw materials of lithium iron phosphate, lithium carbonate ($Li_2CO_3$), iron oxalate ($FeC_2O_4$), and ammonium dihydrogen phosphate ($NH_4H_2PO_4$) are mixed.

Lithium carbonate is a raw material for introducing lithium; iron oxalate is a raw material for introducing iron; and ammonium dihydrogen phosphate is a raw material for introducing phosphoric acid. Note that the present invention is not limited to these raw materials and other materials can be used as long as lithium, iron, and phosphoric acid can be introduced. These raw materials are mixed by a ball mill treatment (a first ball mill treatment).

The ball mill treatment is performed in such a manner that, for example, a solvent is added, and a ball mill with a ball diameter of greater than or equal to $\Phi 1$ mm and less than or equal to $\Phi 10$ mm is rotated at greater than or equal to 50 rpm and less than or equal to 500 rpm for greater than or equal to 30 minutes and less than or equal to 5 hours.

When the raw material are mixed by a ball mill treatment, microparticulation of the raw materials can be performed, which leads to microparticulation of lithium iron phosphate particles after formation. In addition, by a ball mill treatment, the raw materials can be uniformly mixed and, the crystallinity of the lithium iron phosphate particles after formation can be high.

In the second method, microparticulation or crystallinity enhancement is performed by baking materials.

By this method, a mixture of raw materials is subjected to two-step baking, so that the mixture is crystallized. For example, a mixture after the first ball mill treatment by the first method is baked.

Specifically, the mixture is subjected to first baking in a nitrogen atmosphere at a temperature of higher than or equal to 250° C. and lower than or equal to 450° C. for greater than or equal to 1 hour and less than or equal to 20 hours.

After the first baking, the mixture is ground in a mortar or the like.

Then, the ground mixture is subjected to a ball mill treatment (a second ball mill treatment). The second ball mill treatment is performed in such a manner that a solvent is added, and a ball mill with a ball diameter of greater than or equal to $\Phi 1$ mm and less than or equal to $\Phi 10$ mm is rotated at greater than or equal to 50 rpm and less than or equal to 500 rpm for greater than or equal to 30 minutes and less than or equal to 5 hours.

After the second ball mill treatment, the mixture is subjected to second baking in a nitrogen atmosphere at a temperature of higher than or equal to 300° C. and lower than or equal to 700° C. for greater than or equal to 1 hour and less than or equal to 20 hours. Note that the temperature of the second baking is preferably higher than that of the first baking.

After the second baking, the mixture is ground in a mortar or the like.

Then, the ground mixture is subjected to a ball mill treatment (a third ball mill treatment). The third ball mill treatment is performed in such a manner that a solvent is added, and a ball mill with a ball diameter of greater than or equal to $\Phi 1$ mm and less than or equal to $\Phi 10$ mm is rotated at greater than or equal to 50 rpm and less than or equal to 500 rpm for greater than or equal to 30 minutes and less than or equal to 5 hours.

By performing two-step baking as described above, a crystal nucleus is formed by the first baking, so that the second baking can be performed in a shod time. Thus, crystal growth is suppressed and the grain size can be prevented from being increased. That is, microparticulation of lithium iron phosphate particles can be performed. In addition, since a crystal nucleus is formed, the crystallinity can be increased by a short-time baking.

Note that baking may be performed once instead of performing twice. However, in order to suppress the crystal growth, baking for a long time at a low temperature is necessary. For example, baking in that case takes a few days. Therefore, it is preferable that the first baking at a low temperature and the second baking at a higher temperature be performed similarly to the second method.

Figure 5:
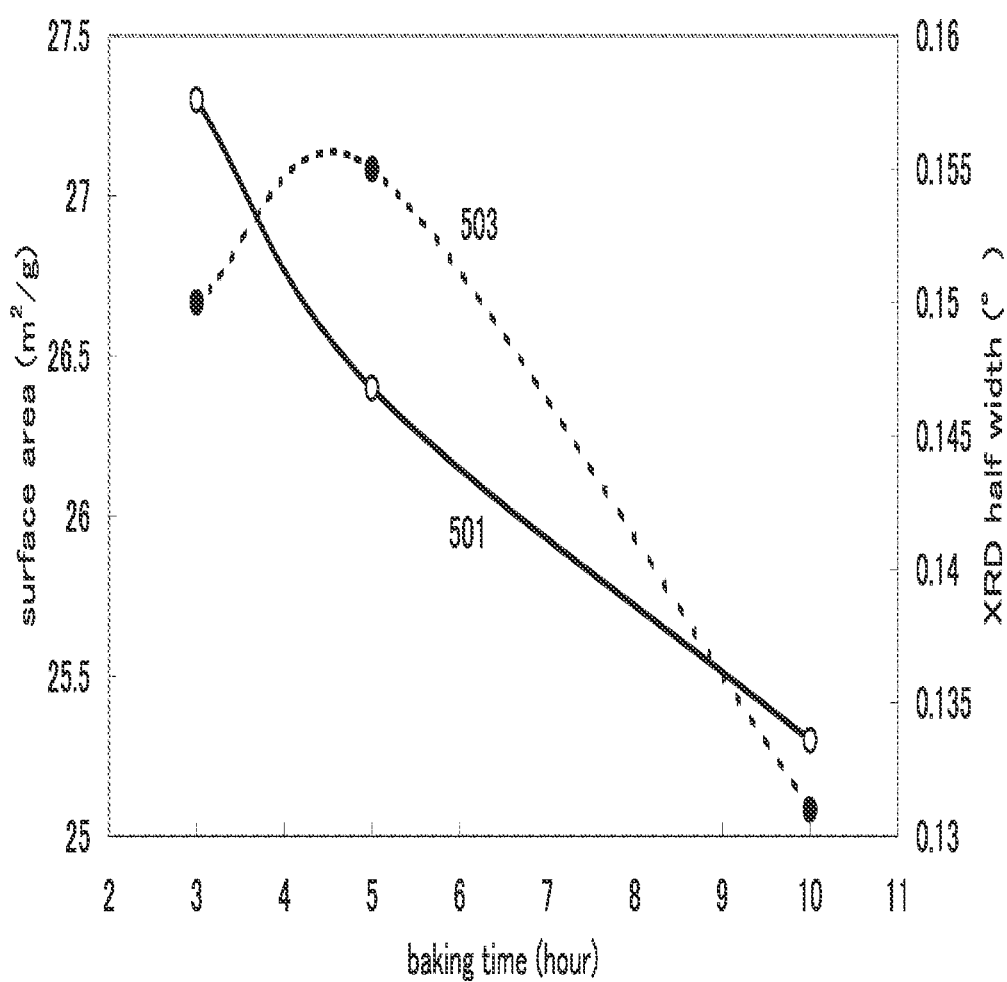
FIG. 5 is a graph showing an example of an effect of carbon coating.

In FIG. 5, a relation between baking time for the second baking and the surface area of lithium iron phosphate (which is plotted with ○ (white dots)) and a relation between baking time for the second baking and the crystallinity of lithium iron phosphate (which is plotted with ● (black dots)) in the case where two-step baking is performed are shown. The horizontal axis shows baking time (hour); the left vertical axis, a surface area per unit mass ($m^2/g$); and the right vertical axis, an X-ray diffraction half width, which shows crystallinity. Note that the baking time is set to 3 hours, 5 hours, and 10 hours and conditions other than the baking time are not varied.

As shown in FIG. 5, when two-step baking is performed so that the baking time for the second baking is shortened, the surface area can be large (as indicated by a solid line 501). Further, the crystallinity can be high even when the baking time is short (as indicated by a dashed line 503).

Note that the material may be subjected to a pressure treatment before being subjected to the first baking or the second baking. For example, the material can be shaped into pellets, in which case the density of the material is increased. When the density is increased, the number of lithium iron phosphate particles per unit mass after formation of the active material is increased. In other words, microparticulation can be performed. Note that when a pressure treatment is performed both before the first baking and before the second baking, an effect of microparticulation can be enhanced.

In the third method, by supporting a surface of a material by a carbon material (which is also referred to as carbon coating), microparticulation is performed.

By this method, after a mixture of raw materials is ground, a surface of the ground material is supported by a carbon material. For example, a material which generates carbon is added to a mixture which is ground after the first baking by the second method.

Specifically, a material which may generate conductive carbon by thermal decomposition (hereinafter referred to as a conductive carbon precursor) is added to the ground mixture. As a conductive carbon precursor, saccharide such as glucose or sucrose is added, for example. By adding a conductive carbon precursor, a surface of the mixture is supported by a carbon material. That is, the mixture is carbon-coated.

By adding saccharide as a conductive carbon precursor, many hydroxyl groups contained in saccharide strongly interact with the surface of the mixture. Accordingly, crystal growth of the lithium iron phosphate particles is suppressed. When crystal growth of the lithium iron phosphate particles is suppressed, the grain size can be prevented from being increased.

Note that saccharide is preferably added at greater than or equal to 1 wt. % and less than or equal to 20 wt %.

Figure 6:
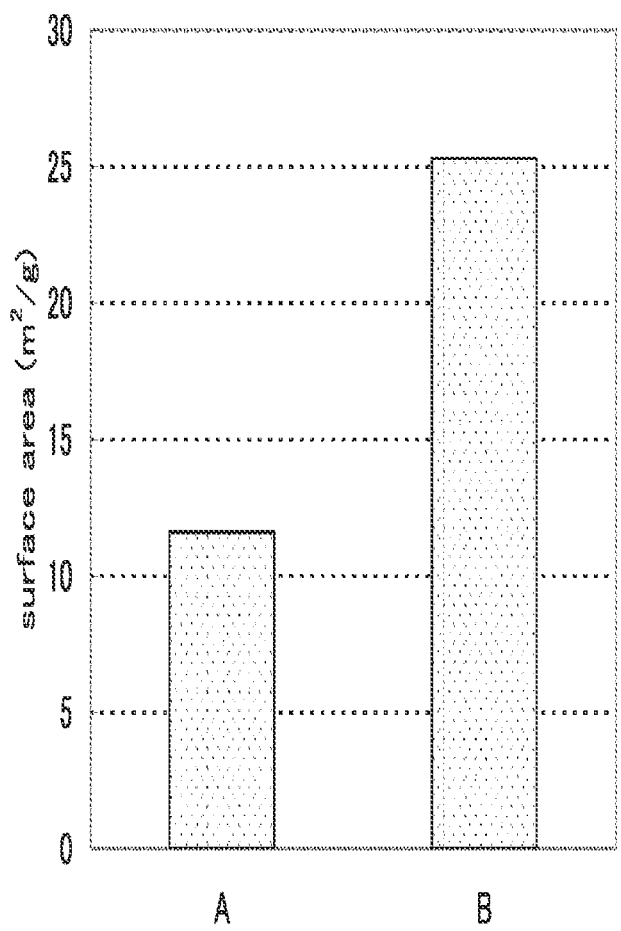
FIG. 6 is a graph showing an example of the characteristics of a power storage device.

In FIG. 6, a relation between carbon coating and the surface area of lithium iron phosphate is shown. In the horizontal axis, the case where carbon coating is performed and the case where carbon coating is not performed are shown; the vertical axis indicates a surface area (m²/g). Note that conditions other than whether or not carbon coating is performed are not varied.

As shown in FIG. 6, the surface area in the case where carbon coating is performed (bar B) can be twice as large as that in the case where carbon coating is not performed (bar A).

When the surface of the ground material is supported by the carbon material as described above, crystal growth of the lithium iron phosphate particles can be suppressed and the lithium iron phosphate particles after formation can be microparticulated.

Note that a surface of the lithium iron phosphate particles after formation is also supported by the carbon material which is used here. Support by a carbon material with high conductivity can reduce the internal resistance of a power storage device and make charge capacity and discharge capacity high. Further, by making discharge capacity high, output per unit mass of the active material can be increased. Output can be 10 W/g or more, preferably 20 W/g or more.

In other words, the characteristics of a power storage device can be improved by lithium iron phosphate particles supported by a carbon material. Therefore, support of a material by a carbon material not only realizes microparticulation but also improves the characteristics of the formed particles.

By performing any of the first to third methods, lithium iron phosphate particles can be microparticulated. By performing the first to third methods as a series of steps, effect of microparticulation becomes further more distinctive. However, these formation methods are examples and the present invention is not limited thereto.

Note that although the case of forming lithium iron phosphate (LiFePO$_4$) of an olivine structure is described in this embodiment, microparticulation of an active material can be performed by any of the first to third methods also in the case of forming other active materials.

For example, a material represented by a general formula $A_xM_yPO_z$ (x≥0, y>0, and z>0) can be used as the active material. Here, A represents an alkali metal such as lithium, sodium, or potassium, or an alkaline earth metal such as beryllium, magnesium, calcium, strontium, or barium. M represents, for example, a transition metal element such as iron, nickel, manganese, or cobalt. As the material represented by the general formula $A_xM_yPO_z$ (x≥0, y>0, and z>0), lithium iron phosphate, sodium iron phosphate, and the like can be given. As the material represented by A and the material represented by M, one or more may be selected from the above respective examples.

Alternatively, a material represented by a general formula $A_xM_yO_z$ (x≥0, y>0, and z>0) can be used as the active material. Examples of such a material include lithium manganate and lithium cobaltate. As the material represented by A and the material represented by M, one or more may be selected from the above respective examples.

Further alternatively, a material represented by a general formula $A_xM_ySiO_z$ (x≥0, y>0, and z>0) can be used as the active material. That is, a material into which silicate is introduced can be used. For example, lithium iron silicate, lithium iron manganese silicate, and the like can be given. As the material represented by A and the material represented by M, one or more may be selected from the respective examples. Note that when x=0 in the above general formula (x≥0), the reactive material (e.g., lithium ions) is completely extracted.

Note that when M is a plurality of transition metal elements, for example, M can be two kinds of transition metal elements that are manganese and iron (when $M_y$ is $Mn_sFe_t$, s+t=1, 0≤s≤1, and 0≤y≤1), two kinds of transition metal elements that are iron and nickel (when $M_y$ is $Fe_tNi_u$, t+u=1, 0≤t≤1, and 0≤u≤1), or three kinds of transition metal elements that are manganese, iron, and nickel (when $M_y$ is $Mn_sFe_tNi_u$, s+t+u=1, 0≤s≤1, 0≤t≤1, and 0≤u≤1). Here, s+t=1, t+u=1, and s+t+u=1 may be replaced with s+t≈1, t+u≈1, and s+t+u≈1, respectively, due to defects or the like.

When M is two kinds of transition metal elements that are manganese and iron (when $M_y$ is $Mn_sFe_t$, s+t=1, 0≤s≤1, and 0≤t≤1), i.e., when iron and manganese whose oxidation-reduction potential is higher than that of iron are used, an oxidation-reduction reaction is enhanced and the charging and discharging characteristics and the like can be improved.

Further alternatively, the active material may be a solid solution containing a plurality of transition metal elements which are described above.

This embodiment can be implemented in combination with any of the other embodiments or the examples as appropriate.

Embodiment 2

In this embodiment, a positive electrode active material of a power storage device is described.

A material to/from which a reactive material (e.g., lithium ions) can be inserted and extracted is used in a power storage device and thus charging and discharging can be performed.

A requisite for an excellent power storage device is high charge or discharge capacity.

In one embodiment of the present invention, an active material supported by a carbon material (a material which is carbon-coated) is used in a positive electrode in order to increase charge and discharge capacity. Since the conductivity of a carbon material is high, the internal resistance of a power storage device can be reduced.

Figure 7A:
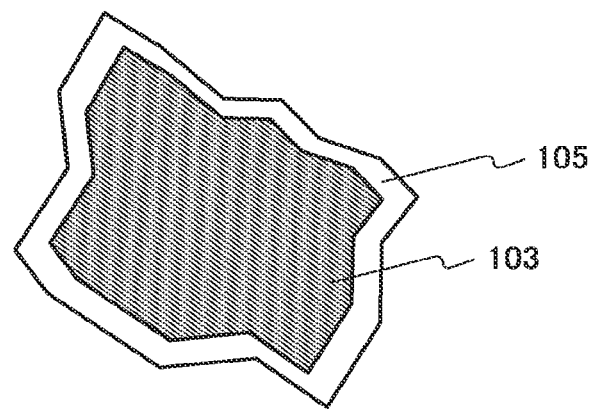
FIGS. 7A to 7C are diagrams each illustrating an example of an active material.
Figure 7B:
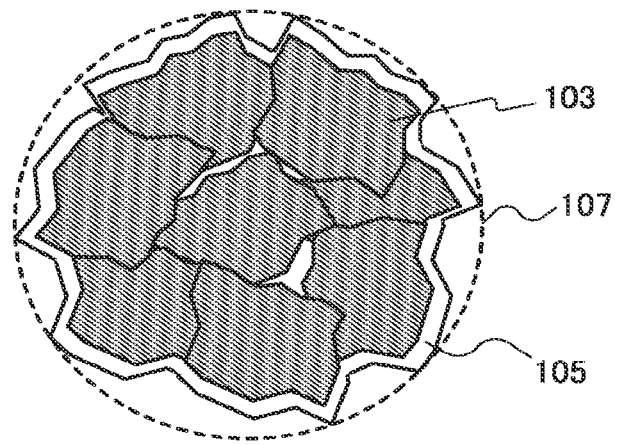
Figure 7C:
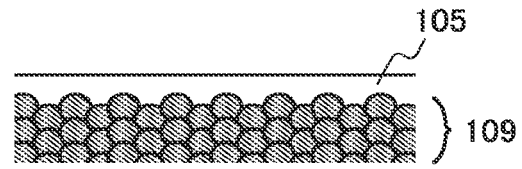

Examples of an active material supported by a carbon material are illustrated in FIGS. 7A to 7C. In FIG. 7A, a surface of the particle 103 of the active material is partly or entirely covered with a carbon material 105. In FIG. 7B, in a particle group 107 which is formed of the aggregating particles 103, a surface of the particle group 107 is partly or entirely covered with the carbon material 105. In FIG. 7C, in a layer (which is also referred to as a particle layer 109) formed of a plurality of particles 103, a surface of the particle layer 109 is partly or entirely covered with the carbon material 105.

Figure 8A:
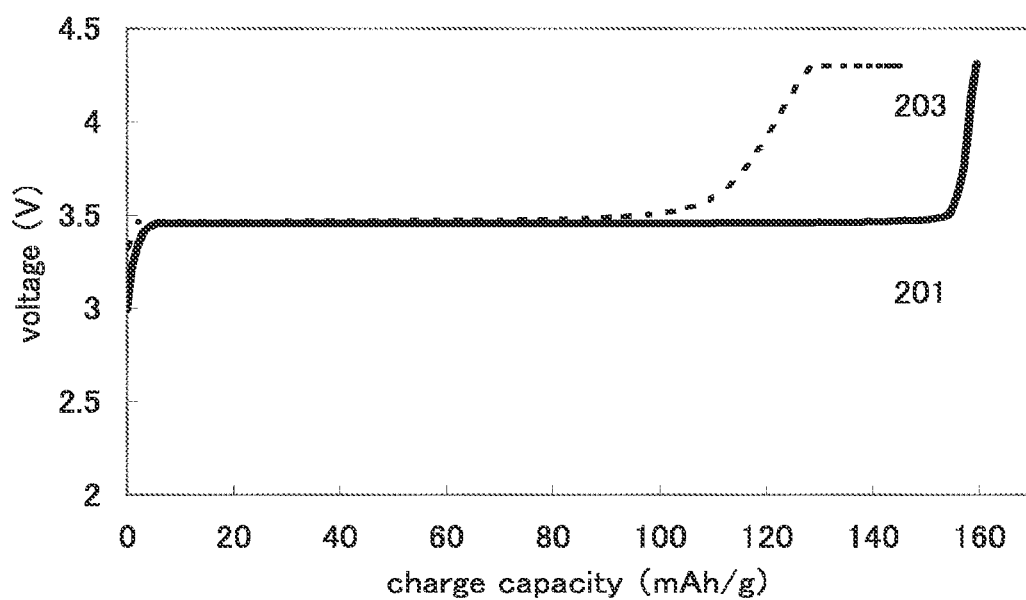
FIGS. 8A and 8B are graphs each showing an example of the characteristics of a power storage device.
Figure 8B:
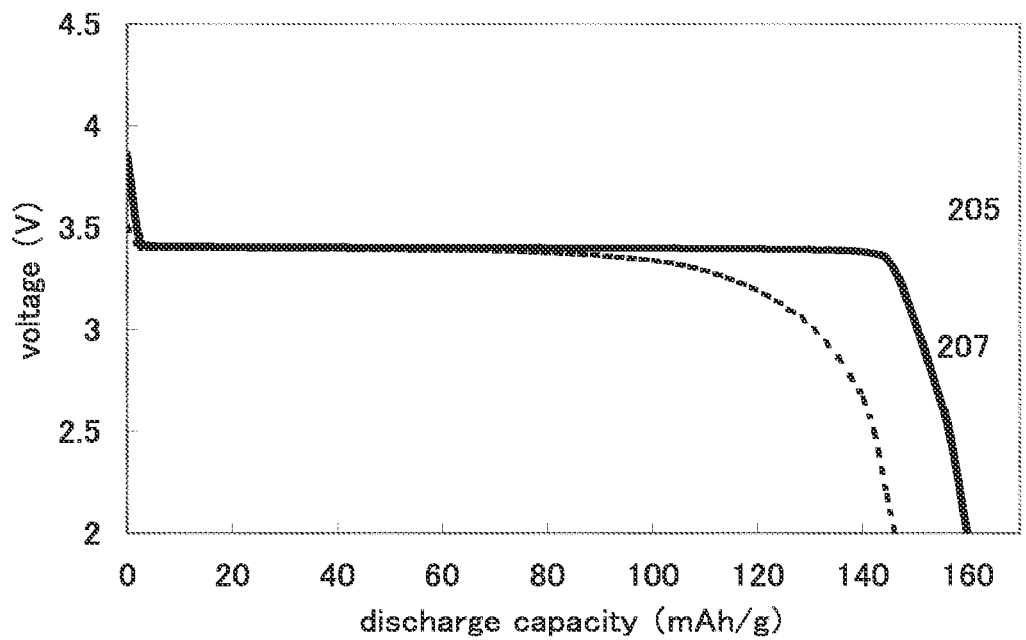

The charging and discharging characteristics of a power storage device in which lithium iron phosphate (LiFePO$_4$) of an olivine structure is used as an active material are shown in FIGS. 8A and 8B. FIG. 8A shows the charging characteristics and FIG. 8B shows the discharging characteristics. In both graphs, the horizontal axis indicates capacity (mAh/g) and the vertical axis indicates voltage (V).

FIG. 8A shows the charging characteristics in the case where carbon coating is performed (a solid line 201) and those in the case where carbon coating is not performed (a dashed line 203).

FIG. 8B shows the discharging characteristics in the case where carbon coating is performed (a solid line 205) and those in the case where carbon coating is not performed (a dashed line 207).

As shown in FIGS. 8A and 8B, the charge capacity and the discharge capacity in the case where carbon coating is performed are 160 mAh/g and the charge capacity and the discharge capacity in the case where carbon coating is not performed are 120 mAh/g to 140 mAh/g.

Note that the theoretical capacity in the case of using lithium iron phosphate is 170 mAh/g. That is, in a power storage device in which lithium iron phosphate supported by a carbon material is used as a positive electrode active material, as much as 94% ((160 mAh/g)/(170 mAh/g)×100 (%)) of lithium in the total lithium iron phosphate can be diffused as lithium ions.

When lithium iron phosphate is supported by a highly conductive carbon material, the internal resistance of a power storage device can be reduced, so that charge capacity and discharge capacity become high.

Next, a method of supporting an active material by a carbon material is described below. Here, the case where lithium iron phosphate is formed as the active material is described.

First of all, as raw materials of lithium iron phosphate, lithium carbonate (Li$_2$CO$_3$), iron oxalate (FeC$_2$O$_4$), and ammonium dihydrogen phosphate (NH$_4$H$_2$PO$_4$) are mixed. Lithium carbonate is a raw material for introducing lithium; iron oxalate is a raw material for introducing iron; and ammonium dihydrogen phosphate is a raw material for introducing phosphoric acid. Note that the present invention is not limited to these raw materials and other materials can be used as long as lithium, iron, and phosphoric acid can be introduced.

After that, the mixture is ground in a mortar or the like.

Then, a substance which may generate conductive carbon by thermal decomposition (hereinafter referred to as a conductive carbon precursor) is added to the ground mixture. As a conductive carbon precursor, saccharide such as glucose or sucrose is added, for example. By adding a conductive carbon precursor, a surface of the mixture is supported by a carbon material. That is, the mixture is carbon-coated.

Note that saccharide is preferably added at greater than or equal to 1 wt % and less than or equal to 20 wt %. Note that the film thickness of the carbon material supporting lithium iron phosphate after manufacture is preferably greater than 0 nm and 100 nm of less. By performing microparticulation, a high discharge potential can be realized, so that output per unit mass of the active material can be 10 W/g or more, preferably 20 W/g or more.

Through the above process, lithium iron phosphate supported by a carbon material can be formed. Further, when a power storage device is manufactured by using this lithium iron phosphate as an active material, the internal resistance of the power storage device is reduced and charge capacity and discharge capacity can be high. In addition, when the lithium iron phosphate particles are mixed with a conductive auxiliary agent in a later step, the conductivity can be further improved. Carbon black such as acetylene black can be used as the conductive auxiliary agent. Note that in the case where sufficient conductivity can be obtained by carbon coating, a conductive auxiliary agent is not necessarily used.

Since lithium iron phosphate can be microparticulated by carbon coating, a diffusion path of lithium ions is increased, so that a charging and discharging rate of the power storage device can be high.

Note that although the case of forming lithium iron phosphate (LiFePO$_4$) of an olivine structure is described in this embodiment, charge capacity and discharge capacity can be high by carbon coating also in the case of forming a different active material.

For example, a material represented by the general formula A$_x$M$_y$PO$_z$ (x≥0, y>0, and z>0) can be used as the active material. Here, A represents an alkali metal such as lithium, sodium, or potassium, or an alkaline earth metal such as beryllium, magnesium, calcium, strontium, or barium. M represents, for example, a transition metal element such as iron, nickel, manganese, or cobalt. As the material represented by the general formula A$_x$M$_y$PO$_z$ (x≥0, y>0, and z>0), lithium iron phosphate, sodium iron phosphate, and the like can be given. As the material represented by A and the material represented by M, one or more may be selected from the above respective examples.

Alternatively, a material represented by the general formula A$_x$M$_y$SiO$_z$ (x≥0, y>0, and z>0) can be used as the active material. Examples of such a material include lithium manganate and lithium cobaltate. As the material represented by A and that represented by M, one or more may be selected from the above respective examples.

Further alternatively, a material represented by, the general formula $A_xM_ySiO_z$ ($x\geq 0$, $y>0$, and $z>0$) can be used as the active material. That is, a material into which silicate is introduced can be used. For example, lithium iron silicate, lithium iron manganese silicate, and the like can be given. As the material represented by A and that represented by M, one or more may be selected from the above respective examples. Note that when $x=0$ in the above general formula ($x\geq 0$), the reactive material (e.g., lithium ions) is completely extracted.

Note that when M is a plurality of transition metal elements, for example, M can be two kinds of transition metal elements that are manganese and iron (when $M_y$ is $Mn_sFe_t$, $s+t=1$, $0\leq s\leq 1$, and $0\leq t\leq 1$), two kinds of transition metal elements that are iron and nickel (when $M_y$ is $Fe_tNi_u$, $t+u=1$, $0\leq t\leq 1$, and $0\leq u\leq 1$), or three kinds of transition metal elements that are manganese, iron, and nickel (when $M_y$ is $Mn_sFe_tNi_u$, $s+t+u=1$, $0\leq s\leq 1$, $0\leq t\leq 1$, and $0\leq u\leq 1$). Here, $s+t=1$, $t+u=1$, and $s+t+u=1$ may be replaced with $s+t\approx 1$, $t+u\approx 1$, and $s+t+u\approx 1$, respectively, due to defects or the like.

When M is two kinds of transition metal elements that are manganese and iron (when $M_y$ is $Mn_sFe_t$, $s+t=1$, $0\leq s\leq 1$, and $0\leq t\leq 1$), i.e., when iron and manganese whose oxidation-reduction potential is higher than that of iron are used, an oxidation-reduction reaction is enhanced and the charging and discharging characteristics and the like can be improved.

Further alternatively, the active material may be a solid solution containing a plurality of transition metal elements which are described above.

This embodiment can be implemented in combination with any of the other embodiments or the examples as appropriate.

Embodiment 3

In this embodiment, a material which can be favorably used as a positive electrode active material that is one embodiment of the present invention is described.

A lithium oxide is used as the positive electrode active material that is one embodiment of the present invention. In this embodiment, an example in which silicic acid-based lithium is used as a lithium oxide is described. Detailed description thereof is given below.

A positive electrode active material according to this embodiment is represented by the general formula $Li_{(2-x)}MSiO_4$ and satisfies conditions (I) and (II) below.

(I) x is a value changing within a range $0\leq x\leq 2$, due to insertion and extraction of a lithium ion during charging and discharging.

(II) M is one or more transition metal elements selected from iron (Fe), nickel (Ni), manganese (Mn), and cobalt (Co).

In a material (silicic acid-based lithium) represented by the general formula $Li_{(2-x)}MSiO_4$, the highest ratio of lithium atoms to the other metal atoms (M atoms) is 2:1 (molar ratio). Therefore, if all the lithium atoms contained in the material can be used for reaction, the largest number of lithium ions (reaction materials) which can be inserted and extracted can be two per one composition. When such a material is used as a positive electrode active material, higher capacitance can be obtained and the characteristics of a power storage device can be improved.

A material represented by the general formula $Li_{(2-x)}MSiO_4$ can have a crystal structure belonging to a space group in which the highest ratio of lithium atoms to the other metal atoms (M atoms) is 2:1 (molar ratio).

For example, when M is iron and $x=0$, $Li_2FeSiO_4$ is obtained and can have a crystal structure belonging to the space group P1211 or a crystal structure belonging to the space group Pmn21. When M is manganese and $x$ 0, $Li_2MnSiO_4$ is obtained and can have a crystal structure belonging to the space group Pmn21 or a crystal structure belonging to the space group P121/n1, When M is cobalt and $x=0$, $Li_2CoSO_4$ is obtained and can have a crystal structure belonging to the space group Pbn21.

Figure 10:
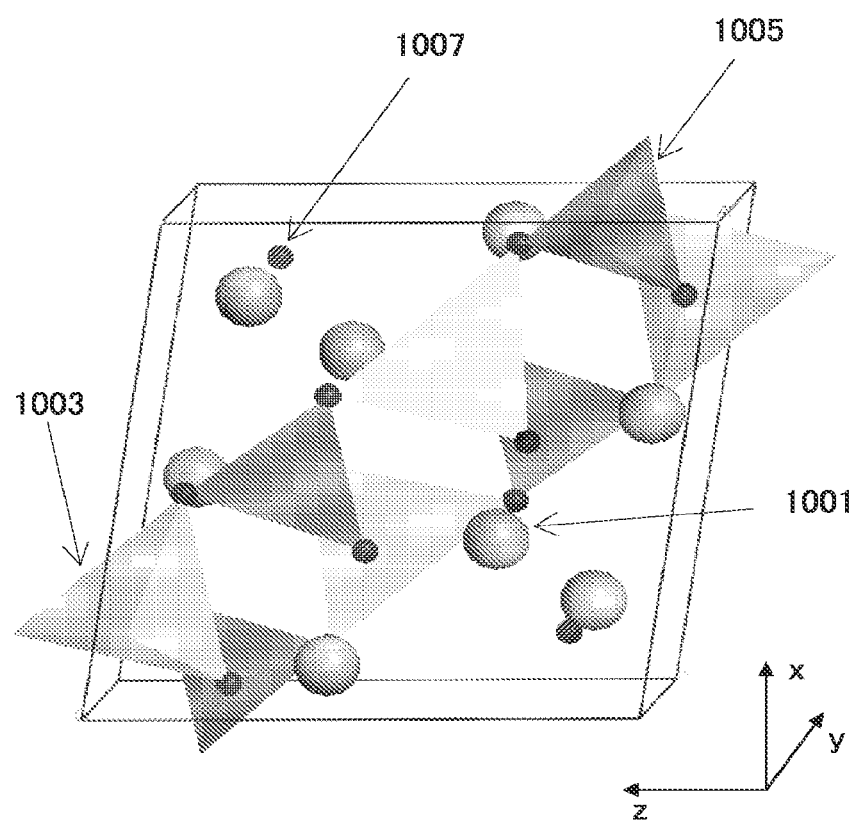
FIG. 10 is a diagram illustrating an example of a crystal structure of a space group (P1211) to which $Li_{(2-x)}MSiO_4$ belongs.

In FIG. 10, an example of a crystal structure of $Li_2FeSiO_4$ which belongs to the space group P1211 is illustrated. The smallest unit of a crystal of $Li_2FeSiO_4$ which belongs to the space group P1211 includes eight lithium atoms 1001, four iron atoms 1003, four silicon atoms 1005, and 16 oxygen atoms 1007. As illustrated in FIG. 10, in $Li_2FeSiO_4$ which belongs to the space group P1211, a ratio of the lithium atoms 1001 to the other metal atoms (the iron atoms 1003) is 2:1. Thus, it can be known that in theory, higher capacitance can be obtained in the case of using $Li_2FeSiO_4$ which belongs to the space group P1211 than in the case of using a material such as $LiCoO_2$ in which a ratio of lithium atoms to the other metal atoms is 1:1.

Figure 11:
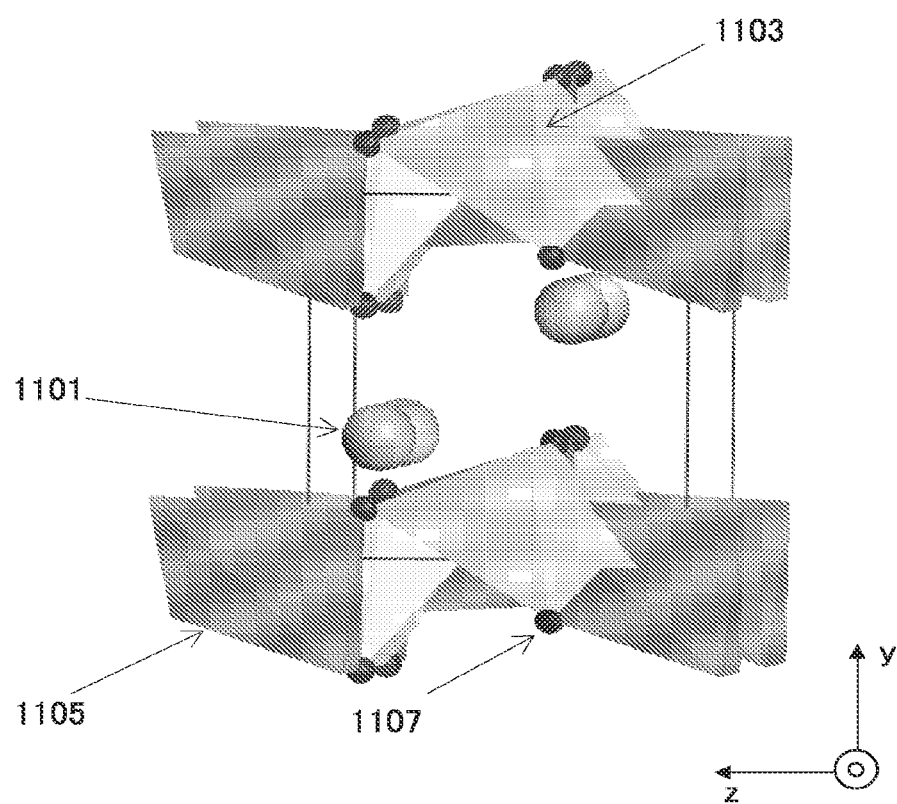
FIG. 11 is a diagram illustrating an example of a crystal structure of a space group (Pmn21) to which $Li_{(2-x)}MSiO_4$ belongs.

In FIG. 11, an example of a crystal structure of $Li_2FeSiO_4$ which belongs to the space group Pmn21 is illustrated. The smallest unit of a crystal of $Li_2FeSiO_4$ which belongs to the space group Pmn21 includes four lithium atoms 1101, two iron atoms 1103, two silicon atoms 1105, and eight oxygen atoms 1107. As illustrated in FIG. 11, in $Li_2FeSiO_4$ which belongs to the space group Pmn21, a ratio of the lithium atoms 1101 to the other metal atoms (the iron atoms 1103) is 2:1. Thus, it can be known that in theory, higher capacitance can be obtained in the case of using $Li_2FeSiO_4$ which belongs to the space group Pmn21 than in the case of using a material such as $LiCoO_2$ in which a ratio of lithium atoms to the other metal atoms is 1:1.

Note that $Li_2MnSiO_4$ which belongs to the space group Pmn21 can also have the crystal structure illustrated in FIG. 11. In this case, the iron atoms 1103 in FIG. 11 are replaced with manganese atoms. Further, in $Li_2MnSiO_4$ which belongs to the space group Pmn21, a ratio of lithium atoms to manganese atoms is 2:1. Thus, in theory, higher capacitance can be obtained in the case of using $Li_2MnSiO_4$ which belongs to the space group Pmn21 than in the case of using a material such as $LiCoO_2$ in which a ratio of lithium atoms to the other metal atoms is 1:1.

Figure 12:
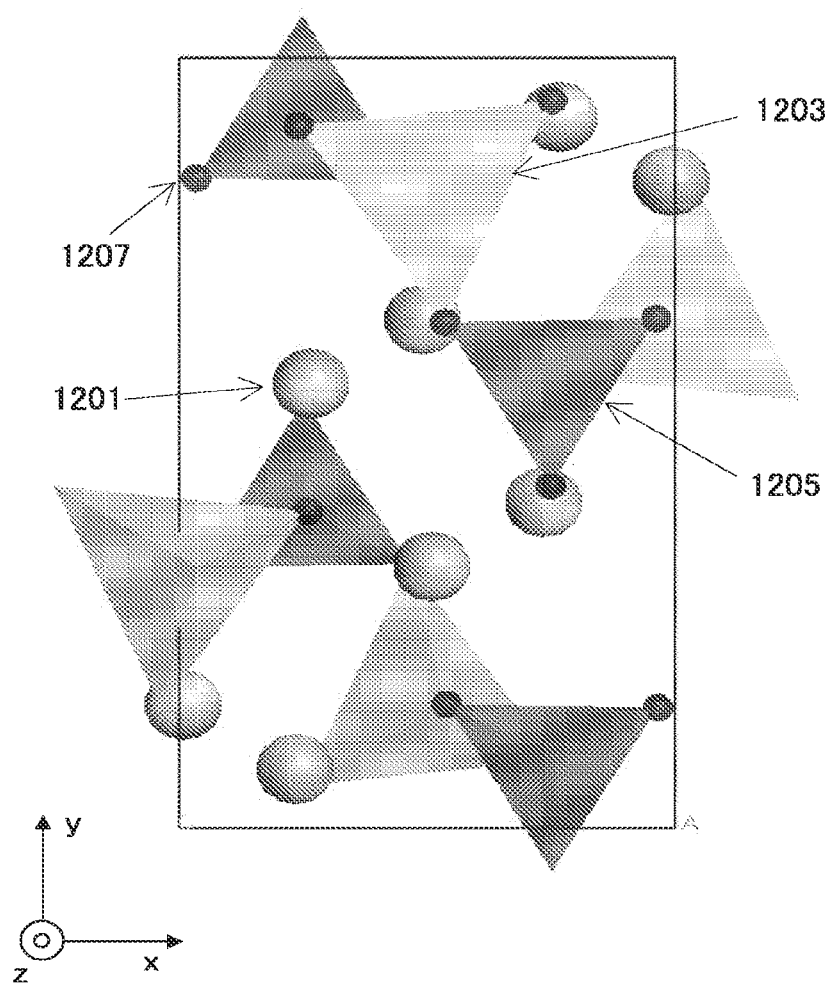
FIG. 12 is a diagram illustrating an example of a crystal structure of a space group (P121/n1) to which $Li_{(2-x)}MSiO_4$ belongs.

In FIG. 12, an example of a crystal structure of $Li_2MnSiO_4$ which belongs to the space group P121/n1 is illustrated. The smallest unit of a crystal of $Li_2MnSiO_4$ which belongs to the space group P121/n1 includes eight lithium atoms 1201, four manganese atoms 1203, four silicon atoms 1205, and 16 oxygen atoms 1207. As illustrated in FIG. 12, in $Li_2MnSiO_4$ which belongs to the space group P121/n1, a ratio of the lithium atoms 1201 to the other metal atoms (the manganese atoms 1203) is 2:1. Thus, it can be known that in theory, higher capacitance can be obtained in the case of using $Li_2MnSiO_4$ which belongs to the space group P121/n1 than in the case of using a material such as $LiCoO_2$ in which a ratio of lithium atoms to the other metal atoms is 1:1.

Figure 13:
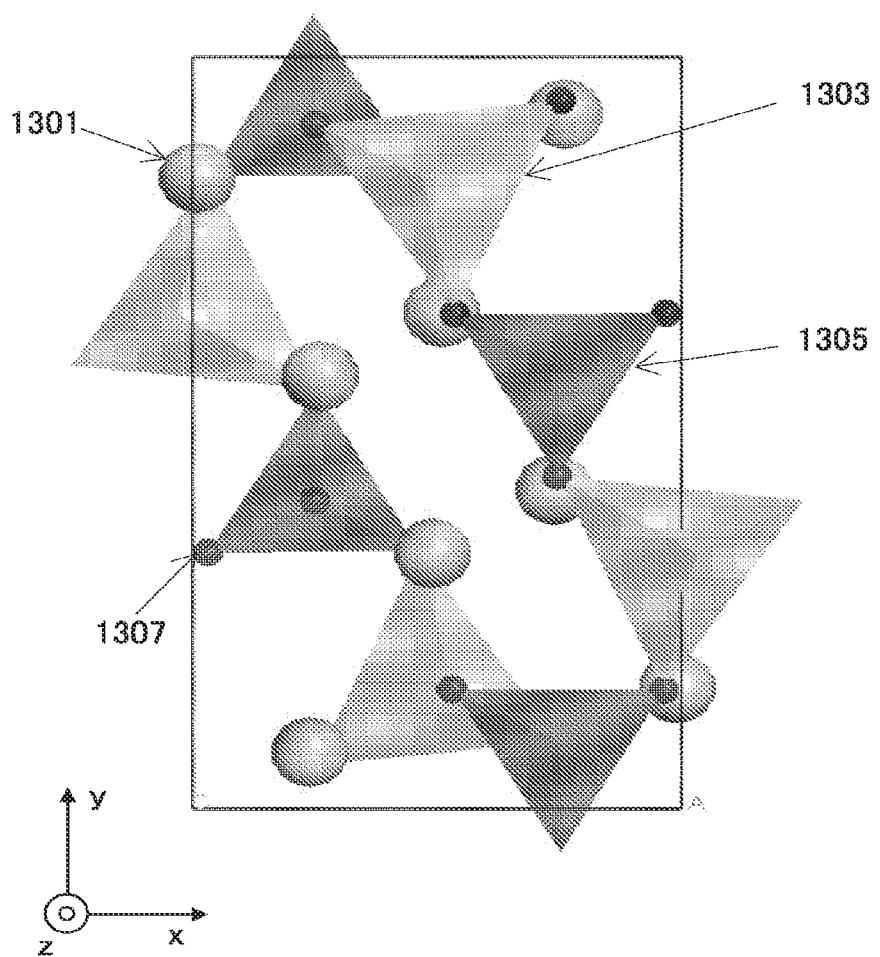
FIG. 13 is a diagram illustrating an example of a crystal structure of a space group (Pbn21) to which $Li_{(2-x)}MSiO_4$ belongs.

In FIG. 13, an example of a crystal structure of $Li_2CoSiO_4$ which belongs to the space group Pbn21 is illustrated. The smallest unit of a crystal of $Li_2CoSiO_4$ which belongs to the space group Pbn21 includes eight lithium atoms 1301, four cobalt atoms 1303, four silicon atoms 1305, and 16 oxygen atoms 1307. As illustrated in FIG. 13, in $Li_2CoSiO_4$ which belongs to the space group Pbn21, a ratio or the lithium atoms 1301 to the other metal atoms (the cobalt atoms 1303) is 2:1. Thus, it can be known that in theory, higher capacitance can be obtained in the case of using $Li_2CoSiO_4$ which belongs to the space group Pbn21 than in the case of using a material such as $LiCoO_2$ in which a ratio of lithium atoms to the other metal atoms is 1:1.

The space group to which a crystal structure of a material represented by the general formula $Li_{(2-x)}MSiO_4$ belongs can be controlled by selecting the kind of the metal M atom, a formation method (e.g., a baking temperature), or the like. As examples of the crystal structures, structures (III) to (VI) below can be given.

(III) a crystal structure belonging to the space group P1211.
(IV) a crystal structure belonging to the space group Pmn21.
(V) a crystal structure belonging to the space group P121/n1.
(VI) a crystal structure belonging to the space group Pbn21.

In a material represented by the general formula $Li_{(2-x)}MSiO_4$, no matter which space group among the above ones the crystal structure belongs to a ratio of lithium atoms to the other metal atoms is 2:1. Therefore, capacitance can be high in theory. When such a material is used as a positive electrode active material, higher capacitance and the like can be obtained and the characteristics of a power storage device can be thus improved.

Note that although examples in which only one kind of element is introduced as the metal M atom is illustrated in FIG. 10, FIG. 11, FIG. 12, and FIG. 13, one embodiment of the present invention is not limited thereto.

For example, as a positive electrode active material, a material represented by a general formula $Li_{(2-x)}Fe_sMn_tSiO_4$ and satisfying conditions (I) and (VII) below can be given.
(I) x is a value changing within a range $0 \leq x \leq 2$, due to insertion and extraction of a lithium ion during charging and discharging.
(VII) $s+t=1$, $0 \leq s \leq 1$, and $0 \leq t \leq 1$ are satisfied.

The above material (which is represented by the general formula $Li_{(2-x)}Fe_sMn_tSiO_4$) is obtained by using iron and manganese as the metal M of a material represented by the general formula $Li_{(2-x)}MSiO_4$. Alternatively, nickel or cobalt may be used as the metal M.

Note that one of the conditions $s+t=1$ in (VII) may be replaced with $s+t \approx 1$ due to defects or the like.

In addition, as a positive electrode active material, a material represented by the general formula $Li_{(2-x)}Fe_sNi_uSiO_4$ and satisfying conditions (I) and (VIII) below can be given.
(I) x is a value changing within a range $0 \leq x \leq 2$, due to insertion and extraction of a lithium ion during charging and discharging.
(VIII) $s+u=1$, $0 \leq s \leq 1$, and $0 \leq u \leq 1$ are satisfied.

The above material (which is represented by the general formula $Li_{(2-x)}Fe_sNi_uSiO_4$) is obtained by using iron and nickel as the metal M of a material represented by the general formula $Li_{(2-x)}MSiO_4$. Alternatively, manganese or cobalt may be used as the metal M.

Note that one of the conditions $s+u=1$ in (VIII) may be replaced with $s+u \approx 1$ due to defects or the like.

Further, as a positive electrode active material, a material represented by the general formula $Li_{(2-x)}Fe_sMn_tNi_uSiO_4$ and satisfying conditions (I) and (IX) below can be given.
(I) x is a value changing within a range $0 \leq x \leq 2$, due to insertion and extraction of a lithium ion during charging and discharging.
(IX) $s+t+u=1$, $0 \leq s \leq 1$, $0 \leq t \leq 1$, and $0 \leq u \leq 1$ are satisfied.

The above material (which is represented by the general formula $Li_{(2-x)}Fe_sMn_tNi_uSiO_4$) is obtained by using iron, manganese, and nickel as the metal M of a material represented by the general formula $Li_{(2-x)}MSiO_4$. Alternatively, cobalt may be used as the metal M.

Note that one of the conditions $s+t+u=1$ in (IX) may be replaced with $s+t+u \approx 1$ due to defects or the like.

As described above, even in the case where two or more kinds of elements are used as the metal M atom, the highest ratio of lithium atoms to the other metal atoms is 2:1. When such a material is used as a positive electrode active material, higher capacitance can be obtained and the characteristics of a power storage device can be thus improved.

This embodiment can be combined with a structure of any of the other embodiments or the examples as appropriate.

Embodiment 4

In this embodiment, an example of a formation method of silicic acid-based lithium is described.

Formation Method of $Li_2FeSiO_4$

An example of a formation method in the case where a metal M atom is iron is described.

$Li_2FeSiO_4$ can be formed with the use of a raw material for introducing lithium, a raw material fir introducing iron, and a raw material for introducing silicate. For example, lithium carbonate ($Li_2CO_3$), iron oxalate ($FeC_2O_4$), and a silicon oxide ($SiO_2$) can be used as a raw material for introducing lithium, a raw material for introducing iron, and a raw material for introducing silicate, respectively. Further, lithium silicate ($Li_2SiO_3$) can be used as a raw material for introducing lithium and silicate. Note that the present invention is not limited to these raw materials and other materials can be used as long as lithium, iron, and silicate can be introduced.

By mixing the materials (the raw materials) and then performing baking, $Li_2FeSiO_4$ can be formed.

The raw materials can be mixed by a ball mill treatment, for example. By performing a ball mill treatment, the raw materials can be microparticulated as well as being mixed, so that $Li_2FeSiO_4$ after formation can be microparticulated. In addition, by performing a ball mill treatment, the raw materials can be uniformly mixed and the crystallinity of $Li_2FeSiO_4$ after formation can be made high.

In the case of mixing the raw materials by a ball mill treatment, the raw materials, a solvent, and balls are put in an apparatus (a ball mill pot) and mixing is performed. As a solvent, acetone, ethanol, or the like can be used. Metallic balls, ceramic balls, or the like can be used. The ball mill treatment can be performed in such a manner that a ball mill with a ball diameter of greater than or equal to $\Phi 1$ mm and less than or equal to $\Phi 10$ mm is rotated at greater than or equal to 50 rpm and less than or equal to 500 rpm for greater than or equal to 30 minutes and less than or equal to 5 hours.

For example, lithium carbonate, iron oxalate dihydrate, and a silicon oxide that are raw materials, acetone that is a solvent, and a ball containing zirconia (Zr) with a ball diameter of $\Phi 3$ mm are put in a ball mill pot and rotation is performed at 400 rpm for 2 hours, so that a mixture of the raw materials can be formed.

Baking of the mixture of the raw materials can be performed, for example, at a baking temperature of higher than or equal to 700° C. and lower than or equal to 1100° C. for greater than or equal to 1 hour and less than or equal to 24 hours.

Note that the mixture of the raw materials may be subjected to two-step baking of first baking (pre-baking) and second baking (main baking). The temperature of the second baking is preferably higher than that of the first baking. By performing two-step baking, $Li_2FeSiO_4$ after formation can be microparticulated or the crystallinity thereof can be increased.

The first baking can be performed, for example, in a nitrogen atmosphere at a baking temperature of higher than or equal to 250° C. and lower than or equal to 450° C. for greater than or equal to 1 hour and less than or equal to 20 hours. The second baking can be performed, for example, in a nitrogen atmosphere at a baking temperature of higher than or equal to 300° C. and lower than or equal to 700° C. for greater than or equal to 1 hour and less than or equal to 20 hours.

Note that the mixture of the raw materials may be subjected to a pressure treatment before being subjected to the first baking or the second baking. For example, the mixture of the raw materials can be shaped into pellets before being baked. In the case where the mixture of the raw materials which is shaped into pellets is subjected to two-step baking, the mixture shaped into pellets is subjected to the first baking and the baked product is ground in a mortar or the like and then mixed by a ball mill treatment or the like; the mixture is shaped into pellets again and then the second baking can be performed.

For example, a mixture of the raw materials (lithium carbonate, iron oxalate dihydrate, and a silicon oxide) which is formed by mixing by the first ball mill treatment is heated to 50° C., so that the solvent (acetone) is evaporated; then, pressure of 150 kgf is applied to the mixture with the use of a pellet press for 5 minutes, so that the mixture is shaped into pellets. The mixture shaped into pellets is subjected to the first baking (pre-baking) in a nitrogen atmosphere at a baking temperature of 350° C. for 10 hours.

After the baked product (the pre-baked product) is slightly ground, the second ball mill treatment is performed in such a manner that the baked product (the pre-baked product), a solvent (acetone), and a ball containing zirconia (Zr) with a ball diameter of Φ3 mm are put in a ball mill pot and rotation is performed at 400 rpm for 2 hours.

The baked product (the pre-baked product) which is mixed by the second ball mill treatment is heated to 50° C., so that the solvent (acetone) is evaporated; then, pressure of 150 kgf is applied to the baked product with the use of a pellet press for 5 minutes, so that the baked product is shaped into pellets. The baked product (the pre-baked product) shaped into pellets is subjected to the second baking (main baking) in a nitrogen atmosphere at a baking temperature of 700° C. or 800° C. for 10 hours. In this example, by setting the baking temperature of the second baking to 700° C., $Li_2FeSiO_4$ having a crystal structure belonging to the space group P1211 can be formed. Further, by setting the baking temperature of the second baking to 800° C., $Li_2FeSiO_4$ having a crystal structure belonging to the space group Pmn21 can be formed.

In $Li_2FeSiO_4$ which is obtained in the above-described manner, the largest number of lithium ions which are inserted and extracted can be two per one composition. When such a material is used as a positive electrode active material, higher capacitance can be obtained, which can contribute to improvement in the characteristics of a power storage device.

Formation Method of $Li_2MnSiO_4$

In the case where the metal M atom is manganese, a raw material for introducing manganese is used instead of a raw material for introducing iron which is used in the above-described formation method of $Li_2FeSiO_4$. For example, lithium silicate ($Li_2SiO_3$) and manganese oxalate ($MnC_2O_4$) can be used as raw materials. By mixing the materials (the raw materials) and then performing baking, $Li_2MnSiO_4$ can be formed.

In $Li_2FeSiO_4$ which is obtained in the above-described manner, the largest number of lithium ions which are inserted and extracted can be two per one composition. When such a material is used as a positive electrode active material, higher capacitance can be obtained which can contribute to improvement in the characteristics of a power storage device.

Although an example in which the metal M atom is iron or manganese is described in this embodiment, a desired material which is represented by the general formula $Li_2FeSiO_4$ can be formed by appropriately selecting a raw material for introducing the metal M atom.

This embodiment can be combined with a structure of any of the other embodiments or the examples.

Embodiment 5

In this embodiment, an example of a power storage device which uses the positive electrode active material described in the above embodiment is described.

Figure 14A:
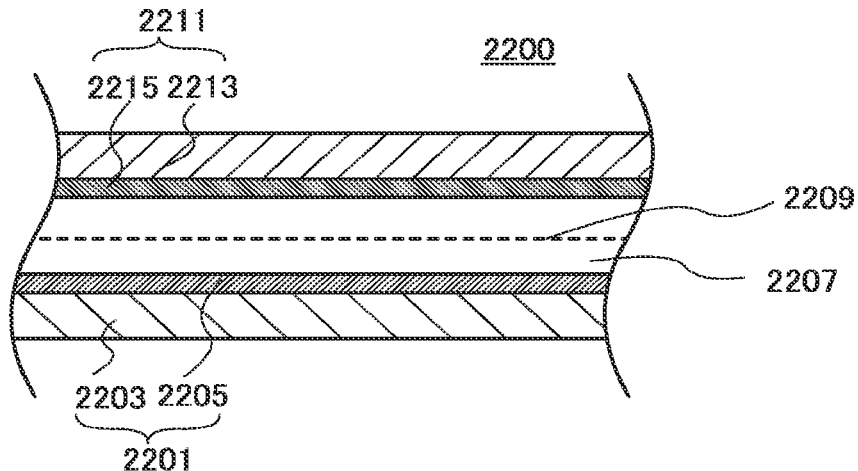
FIGS. 14A to 14C are diagrams illustrating an example of a structure of a power storage device.

A part of a structure of a power storage device 2200 is illustrated in FIG. 14A. The power storage device 2200 includes a positive electrode 2201 and a negative electrode 2211 which faces the positive electrode 2201 with an electrolyte 2207 provided therebetween.

The positive electrode 2201 includes a collector 2203 and a positive electrode active material layer 2205 provided over the collector 2203.

An active material (the positive electrode active material layer 2205) of the positive electrode 2201 is formed using the material which is described in the above embodiment. The above embodiment can be referred to for materials and a formation method of the positive electrode active material layer 2205. As a material of the collector 2203, a conductive material such as platinum, copper, or titanium can be used, for example.

The negative electrode 2211 includes a collector 2233 and a negative electrode active material layer 2215 provided over the collector 2213. As a material of the collector 2213, a conductive material such as platinum, copper, or titanium can be used, for example. As a material of the negative electrode active material layer 2215, a carbon material such as graphite, a lithium metal, silicon, or the like can be used.

The electrolyte 2207 has a function of transporting a reactive material (e.g., lithium ions). A material of the electrolyte 2207 can be solid or liquid.

In the case where the material of the electrolyte 2207 is solid, $Li_3PO_4$, $Li_xPO_yN_z$ (x, y, and z are positive real numbers) which is formed by mixing $Li_3PO_4$ with nitrogen, $Li_2S$—$SiS_2$, $Li_2S$—$P_2S_5$, $Li_2S$—$B_2S_3$, or the like can be used. Alternatively, any of these which is doped with LiI or the like can be used.

In the case where the material of the electrolyte 2207 is liquid, the electrolyte includes a solvent and a solute (salt) dissolved in the solvent. As the solvent, any of cyclic carbonates such as propylene carbonate and ethylene carbonate, or chain-like carbonates such as dimethyl carbonate and diethyl carbonate can be used. As the solute (salt), for example, a solute (salt) containing one or more kinds of light metal salts (lithium salt and the like) such as $LiPF_6$, $LiBF_4$, or LiTFSA can be used.

Note that a separator 2209 is provided in the case where the electrolyte 2207 is liquid. The separator 2209 prevents contact between the positive electrode 2201 and the negative electrode 2211 and has a function of allowing passage of a reactive material (e.g., lithium ions). As a material of the separator 2209, for example, paper, nonwoven fabric, a glass fiber, a synthetic fiber such as nylon (polyamide), vinylon (a polyvinyl alcohol based fiber that is also referred to as vinalon), polypropylene, polyester, acrylic, polyolefin, or polyurethane, or the like can be used. However, a material which does not dissolve in the electrolyte 2207 should be selected. Further, the separator 2209 may be provided even when a solid electrolyte is used as the electrolyte 2207.

Next, an example of charging and discharging in the case where a lithium ion secondary battery is used as the power storage device is described.

Figure 14B:
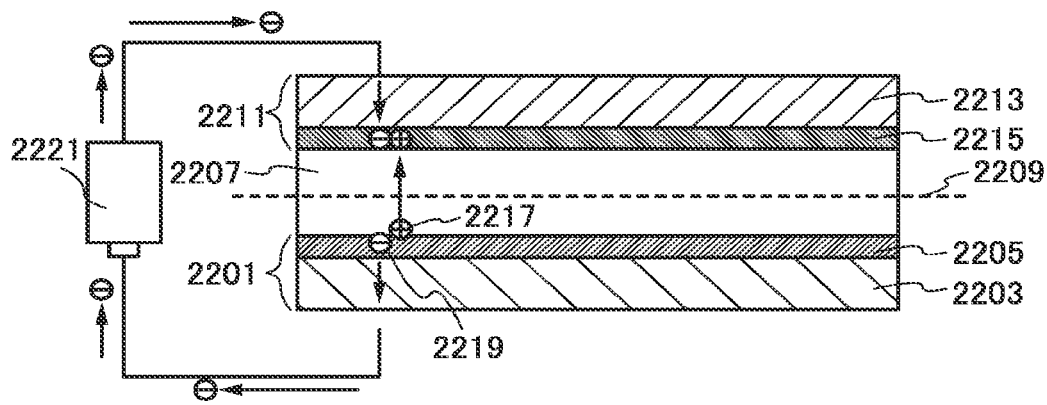

A power source 222 is connected between the positive electrode 2201 and the negative electrode 2211 as illustrated in FIG. 14B, whereby charging can be performed. When voltage is applied from the power source 2221, lithium in the positive electrode 2201 is ionized and extracted from the positive electrode 2201 as a lithium ion 2217 and an electron 2219 is generated. The lithium ion 2217 moves to the negative electrode 2211 through the electrolyte 2207. The electron 2219 moves to the negative electrode 2211 through the power source 2221. Then, the lithium ion 2217 receives the electron 2219 in the negative electrode 2211 and is inserted into the negative electrode 2211 as lithium.

Figure 14C:
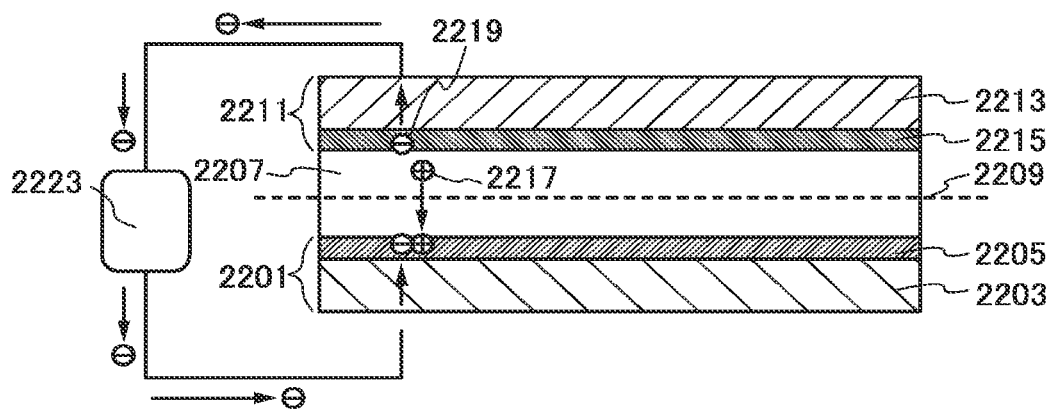

In discharging, a load 2223 is connected between the positive electrode 2201 and the negative electrode 2211 as illustrated in FIG. 14C, whereby discharging can be performed. Lithium in the negative electrode 2211 is ionized and extracted from the negative electrode 2211 as the lithium ion 2217 and the electron 2219 is generated. The lithium ion 2217 moves to the positive electrode 2201 through the electrolyte 2207. The electron 2219 moves to the positive electrode 2201 through the load 2223. Then, the lithium ion 2217 receives the electron 2219 in the positive electrode 2201 and is inserted into the positive electrode 2201 as lithium.

As described above, charging and discharging are performed by movement of lithium ions between the positive electrode 2201 and the negative electrode 2211. By applying the material described in the above embodiment to the positive electrode active material layer 2205 in the positive electrode 2201 of the power storage device 2200, a higher charging and discharging rate, higher capacitance, and the like can be obtained and the characteristics of the power storage device can be thus improved.

This embodiment can be implemented in combination with any of the other embodiments or the examples as appropriate.

Embodiment 6

In this embodiment, a power storage device having a structure which is different from that described in the above embodiment will be described.

As a negative electrode active material, a carbon material such as graphite has been already put to practical use. However, the theoretical capacity of a carbon material is limited and it is difficult to obtain higher capacitance by using such a carbon material which has already been put to practical use. In this embodiment, a silicon material is used as a negative electrode active material so that the characteristics of a power storage device are improved.

The material described in the above embodiment is used as a positive electrode active material in this embodiment. Thus, the characteristics of a power storage device can be improved.

Further, a silicon material is used as a negative electrode active material in this embodiment. In that case, not only the positive electrode active material described in the above embodiment but also the negative electrode can contribute to improvement in the characteristics of the power storage device.

Here, a feature of this embodiment is that crystalline silicon is used as a negative electrode active material so that the characteristics of a power storage device are effectively improved. It is preferable that crystalline silicon which is crystallized with the use of a catalytic element be used as the negative electrode active material. In crystalline silicon, a diffusion rate of a reactive material (e.g., lithium ions) is higher than in amorphous silicon; thus, further improvement in the characteristics of the power storage device can be realized in the case of using crystalline silicon.

Crystalline silicon can be obtained by crystallizing amorphous silicon by a heat treatment. At this time, crystallization is preferably performed using a catalytic element, in which case a process temperature for crystallization can be lowered and process time can be shortened.

By using silicon as a negative electrode active material, higher capacitance can be obtained than in the case of using a carbon material. In addition, by using crystalline silicon in particular, a diffusion rate of carrier ions can be higher than in the case of using amorphous silicon. Further, when crystalline silicon is formed by a method using a catalytic element, a process temperature for crystallization can be lowered and process time can be shortened. In other words, when a silicon layer crystallized with the use of a catalytic element is used as a negative electrode active material layer, the characteristics of a power storage device can be improved by a formation method which can realize a reduced manufacturing cost and improved productivity.

A structure and a formation method of a negative electrode is described with reference to FIGS. 15A to 15D. As a structure of a power storage device, the structure illustrated in FIGS. 14A to 14C can be employed and the negative electrode here corresponds to the negative electrode 2211 illustrated in FIGS. 14A to 14C.

Figure 15A:
FIGS. 15A to 15D are diagrams illustrating an example of a method for forming a negative electrode.

An amorphous silicon layer 413 is formed over a negative electrode collector 411 (see FIG. 15A).

As the negative electrode collector 411, a material with high conductivity, such as titanium, nickel, copper, indium, tin, or silver is used. For example, titanium is used as the negative electrode collector 411 in this embodiment.

The amorphous silicon layer 413 is funned to a thickness of greater than or equal to 100 nm and less than or equal to 5 μm, preferably greater than or equal to 1 μm and less than or equal to 3 μm by a plasma CVD method, a low pressure CVD method, a sputtering method, a vacuum evaporation method, or the like. In the case where the amorphous silicon layer 413 has a thickness of less than 100 nm, a negative electrode active material layer 417, which is obtained after crystallization, becomes so thin that charging and discharging cannot be performed in some cases. In the case where the amorphous silicon layer 413 has a thickness of greater than 5 μm, the amorphous silicon layer 413 cannot be sufficiently crystallized in some cases; in other cases, peeling of the negative electrode active material layer 417, which is obtained alter crystallization, may occur due to stress change at the time of charging and discharging. That is why the amorphous silicon layer 413 is preferably formed to the thickness within the above range.

For example, in this embodiment, the amorphous silicon layer 413 having a thickness of 3 μm is formed by a plasma CVD method.

Figure 15B:
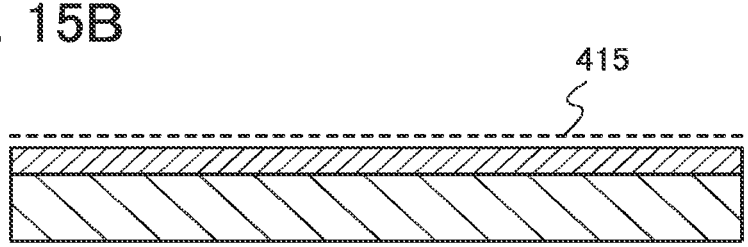

A catalytic element 415 for enhancing crystallization is added to the amorphous silicon layer 413 (see FIG. 15B).

As the catalytic element 415, an element which enhances crystallization of the amorphous silicon can be used. Specifically, a metal element can be used as the catalytic element 415; for example, one or more elements selected from nickel (Ni), copper (Cu), indium (In), tin (Sn), and silver (Ag) can be used. The catalytic element reads with silicon of the amorphous silicon by a later heat treatment so as to form a silicide. The silicide serves as a crystal nucleus so as to contribute to later crystal growth.

For addition of the catalytic element 415, the catalytic element 415 may be applied on a surface of the amorphous silicon layer 413; alternatively, the catalytic element may be directly attached to the surface of the amorphous silicon layer 413 by a sputtering method, a vacuum evaporation method, or the like.

By adding the catalytic element 415 to the amorphous silicon layer 413, a crystallization temperature of the amorphous silicon layer 413 can be lowered by approximately 50° C. to 100° C. Besides, time required for crystallization of the amorphous silicon layer 413 can be shortened to about one fifth to one tenth.

Note that nickel can be very favorably used as the catalytic element 415 for its effect and reproducibility. A nickel silicide is formed when amorphous silicon is crystallized with the use of nickel and is to serve as a crystal nucleus when the amorphous silicon is crystallized. In this embodiment, a specific method for adding nickel us the catalytic element 415 to the amorphous silicon layer 413 is described with reference to FIGS. 16A and 16B.

Figure 16A:
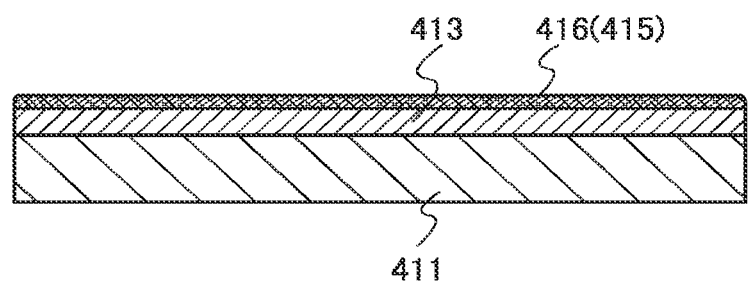
FIGS. 16A and 16B are diagrams illustrating an example of a method for forming a negative electrode.

As illustrated in FIG. 16A, a solution 416 containing the catalytic element 415 is added to the surface of the amorphous silicon layer 413. For example, in the case of using nickel as the catalytic element 415, the solution 416 can be a nickel acetate solution, a nickel chloride solution, a nickel nitrate solution, or a nickel sulfate solution. In this embodiment, a nickel acetate solution is used as the solution 416.

Figure 16B:
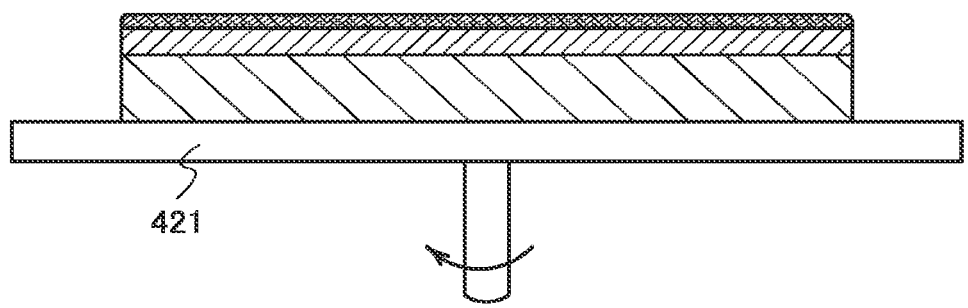

As illustrated in FIG. 16B, spin drying is performed using a spinner 421. By performing spin drying, the solution 416 containing the catalytic element 415 can be uniformly kept on the surface of the amorphous silicon layer 413.

Note that a thin oxide layer is preferably formed on the surface of the amorphous silicon layer 413 before the solution 416 is added. This is because when the solution 416 contains water, the solution 416 is repelled by the hydrophobic surface of the amorphous silicon layer 413 and the catalytic element 415 cannot be added to the whole surface of the amorphous silicon layer 413 in some cases. By forming a thin oxide layer on the surface of the amorphous silicon layer 413, the surface can have higher wettability with respect to the solution 416 (the surface can be hydrophilic). The oxide layer can be formed, for example, by irradiating the surface of the amorphous silicon layer 413 with UV light, or processing the surface of the amorphous silicon layer 413 with the use of an ammonia hydrogen peroxide mixture, ozone water, or the like. By such a method, an oxide layer is funned extremely thin, whereby the catalytic element 415 can reach the amorphous silicon layer 413 through the oxide layer.

Alternatively, an organic solution such as an octylic acid solution or a toluene solution can also be used as the solution 416. Organic solutions are preferable because the solutions contain carbon belongs to the same element group as silicon and achieve excellent wetting with the surface of the amorphous silicon layer 413.

Figure 15C:
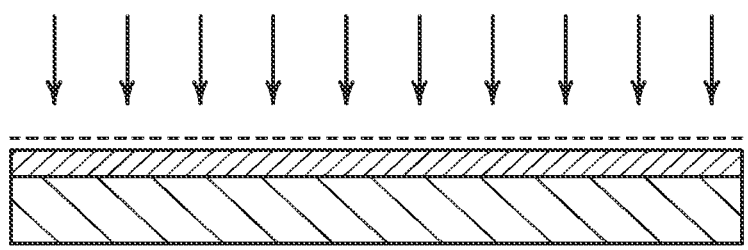
Figure 15D:
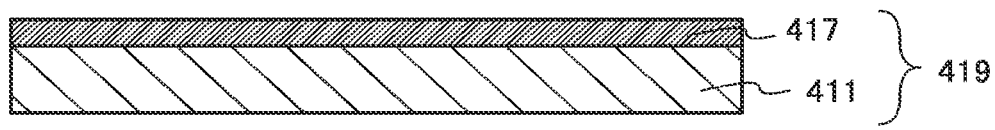

The amorphous silicon layer 413 is subjected to a heat treatment (see FIG. 15C). By this heat treatment, the amorphous silicon layer 413 is crystallized and a crystalline silicon layer is obtained. The crystalline silicon layer which is thus obtained can be used as the negative electrode active material layer 417. In this manner, a negative electrode 419 in which the negative electrode active material layer 417 is provided over the negative electrode collector 411 can be obtained (see FIG. 15D).

The heat treatment for crystallization of the amorphous silicon layer 413 can be performed in a heating furnace, for example. Alternatively, the heat treatment can be light irradiation such as laser beam irradiation.

When the heat treatment is performed in a heating furnace, a temperature can be set to higher than or equal to 450° C. and lower than or equal to 750° C., preferably higher than or equal to 550° C. and lower than or equal to 620° C. Further, heating time can be set to greater than or equal to 1 hour and less than or equal to 24 hours, preferably greater than or equal to 4 hours and less than or equal to 10 hours. For example, the heat treatment is performed at 550° C. for 4 hours.

In the case where laser beam irradiation is employed as the heat treatment as illustrated in FIG. 15C, energy density can be set to greater than or equal to 100 mJ/cm$^2$ and less than or equal to 400 mJ/cm$^2$, preferably greater than or equal to 20 mJ/cm$^2$ and less than or equal to 400 mJ/cm$^2$; typically, the energy density an be set to 250 mJ/cm$^2$. For example, a laser beam (wavelength: 248 nm, pulse width: 20 nsec) of a KrF excimer laser is used for performing the heat treatment.

When the heat treatment is performed, the catalytic element 415 moves in the amorphous silicon layer 413 and serves as a crystal nucleus, thereby enhancing crystallization. For example, in the case of using nickel as the catalytic element 415, nickel reacts with silicon of the amorphous silicon by the heat treatment so as to form a nickel silicide. The nickel silicide serves as a crystal nucleus so as to contribute to later crystal growth. Thus, crystallization is enhanced, so that a process temperature for crystallization can be lowered, process time can be shortened, and a reduced manufacturing cost and improved productivity can be brought about.

Note that the catalytic element 415 remaining on the crystalline silicon layer serving as the negative electrode active material layer 417 is not necessarily removed. This is because the catalytic element 415 is a metal element and has conductivity.

Here, when the amorphous silicon layer 413 is crystallized with the use of the catalytic element 415, the catalytic element is segregated on the outmost surface of the crystalline silicon layer the negative electrode active material layer 417) after crystallization in some cases, which depends on a method and conditions of the heat treatment. In this case, in the crystalline silicon layer, the concentration of the catalytic element 415 is higher in a region closer to the surface of the crystalline silicon layer in the depth direction (film thickness direction). Further, the catalytic element 415 is oxidized by the heat treatment so as to be a conductive oxide. For example, in the case of using nickel as the catalytic element 415, a nickel oxide is segregated on the outmost surface of the crystalline silicon layer.

Figure 17A:
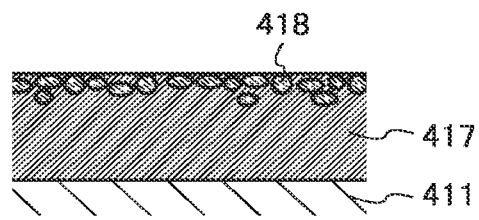
FIGS. 17A and 17B are diagrams each illustrating an example a negative electrode active material layer.
Figure 17B:
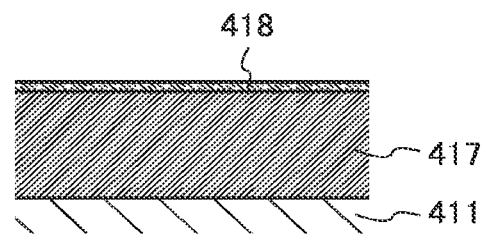

In FIGS. 17A and 17B, segregation of a conductive oxide 418 on the outmost surface of the negative electrode active material layer 417 (the crystalline silicon layer) is illustrated. In FIG. 17A, the conductive oxide 418 is segregated in the form of particles on the outmost surface of the negative electrode active material layer 417. In FIG. 17B, the conductive oxide 418 is segregated in the form of a layer on the outmost surface of the negative electrode active material layer 417.

The conductive oxide 418 has conductivity. Therefore, segregation of the conductive oxide 418 on the outmost surface of the negative electrode active material layer 417 is not particularly problematic. Thus, the use of the catalytic element can bring about advantageous effects on the process and make the application of the crystalline silicon lawyer to the negative electrode active material layer 417 effective.

Note that in the case of using copper, indium, tin, or silver the catalytic element 415, a copper oxide, an indium oxide, a tin oxide, or a silver oxide is segregated as a result of oxidation. Similarly to a nickel oxide, these oxides are also conductive oxides and can bring about the above-described effect.

Through the above steps, the negative electrode 419 can be formed. In a negative electrode according to this embodiment, a crystalline silicon layer is applied to a negative electrode active material. Thus, higher capacitance can be obtained and the characteristics of a power storage device can be improved. Besides, since a crystalline silicon layer which is formed through crystallization with the use of a catalytic element is applied, a reduced manufacturing cost and improved productivity can be brought about. Further, in a positive electrode, the material described in the above embodiment is used as a positive electrode active material; therefore, both the negative electrode and the positive electrode can contribute to improvement in the characteristics of the power storage device.

This embodiment can be combined with a structure of any of the other embodiments or the examples as appropriate.

Embodiment 7

In this embodiment, a power storage device having a structure which is different from that described in the above embodiment will be described.

In Embodiment 6, an example is described in which a crystalline silicon layer serving as the negative electrode active material layer 417 is formed in the following manner: the amorphous silicon layer 413 is formed over the negative electrode collector 411; the catalytic element 415 is added to the amorphous silicon layer 413; and the amorphous silicon layer 413 is then crystallized by a heat treatment. In this embodiment, an example is described in which a crystalline silicon layer serving as a negative electrode active material layer is formed by utilizing the negative electrode collector itself as a catalytic element.

Figure 18A:
FIGS. 18A and 18B are diagrams illustrating an example of a method for forming a negative electrode.

An amorphous silicon layer 453 is formed over a negative electrode collector 451 (see FIG. 18A).

The negative electrode collector 451 is formed using a material which contains a catalytic element enhancing crystallization of the amorphous silicon and has conductivity. Any element can be used as the catalytic element here as long as it is the same as the catalytic element 415; for example, nickel (Ni), copper (Cu), indium (In), tin (Sn), silver (Ag), and the like can be given. The negative electrode collector 451 contains one or more of the above catalytic elements. Note that the negative electrode collector 451 may contain either a simple substance of a catalytic element or an alloy of a catalytic element and another material. Note that in the case where the negative electrode collector 451 contains an alloy, a material which does not form an alloy with lithium is preferably selected. This is because there is a possibility of a decrease in stability of the negative electrode collector 451 itself in the case where a material which forms an alloy with lithium is used.

The amorphous silicon layer 453 is formed in a manner similar to that of the above-described amorphous silicon layer 413.

Figure 18B:
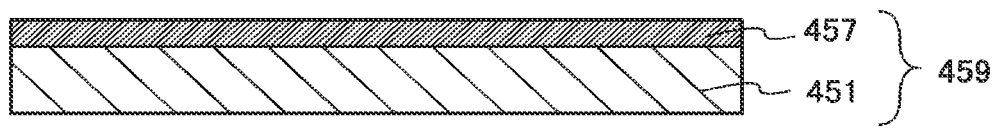

Then, the amorphous silicon layer 453 is subjected to a heat treatment. By this heat treatment, the amorphous silicon layer 453 is crystallized and a crystalline silicon layer serving as a negative electrode active material layer 457 is obtained. Thus, a negative electrode 459 in which the negative electrode collector 451 and the negative electrode active material layer 457 are stacked is formed (see FIG. 18B).

When the heat treatment is performed on the amorphous silicon layer 453, thermal diffusion of the catalytic element contained in the negative electrode collector 451 is caused and the catalytic element moves from the negative electrode collector 451 into the amorphous silicon layer 453. Thus, crystal growth of the amorphous silicon layer 453 proceeds from an interface between the amorphous silicon layer 453 and the negative electrode collector 451 to the other surface of the amorphous silicon layer 453. The crystal growth proceeds from the bottom (the interface between the amorphous silicon layer 453 and the negative electrode collector 451) to the top (the other surface) in the depth direction (film thickness direction) of the amorphous silicon layer 453. Therefore, in the obtained crystalline silicon layer, the concentration of the catalytic element is lower in a region closer to the top in the depth direction. In other words, the concentration of the catalytic element is lower in a region closer to a top surface of the crystalline silicon layer.

The conditions of the heat treatment which is performed on the amorphous silicon layer 413 and is described with reference to FIG. 15C may be applied to the heat treatment her. In this embodiment, since the negative electrode collector 451 functions as a catalytic element, a process temperature for crystallization can be lowered and process time can be shortened. Further, a reduced manufacturing cost and improved productivity can be brought about.

Besides, in this embodiment, a step of adding a catalytic element is not necessary because the negative electrode collector 451 itself functions as a catalytic element, which also lead to a reduced manufacturing cost and improved productivity.

Note that the catalytic element remaining on the crystalline silicon layer serving as the negative electrode active material layer 457 is not necessarily removed. This is because the catalytic element is a metal element and has conductivity.

Through the above steps, a negative electrode can be formed. A crystalline silicon layer is applied to a negative electrode active material in this embodiment. Thus, higher capacitance can be obtained and the characteristics of a power storage device can be improved. Further, since an amorphous silicon layer is crystallized with a negative electrode collector itself functioning as a catalytic element, a further reduction in a manufacturing cost and further improvement in productivity can be brought about. In addition, in a positive electrode, the material described in the above embodiment is used as a positive electrode active material; therefore, both the negative electrode and the positive electrode can contribute to improvement in the characteristics of the power storage device.

This embodiment can be combined with a structure of any of the other embodiments or the examples as appropriate.

Embodiment 8

In this embodiment, a power storage device having a structure which is different from that described in the above embodiment will be described.

In this embodiment, a negative electrode includes a collector, an active material layer, and a mixed layer of a collector material and an active material. The collector is formed using a metal material and a silicon material is used as a negative electrode active material. The mixed layer is a mixed layer of the metal material and the silicon material.

The silicon material is used as the negative electrode active material. Since the theoretical capacity of a silicon material can be higher than that of a carbon material, higher capacitance can be obtained and the characteristics of a power storage device can be improved.

Further, since the mixed layer of the collector material and the active material is provided between the collector and the active material layer, adhesion between the collector and the active material layer can be increased and electrons can be more easily donated and accepted. This also contributes to improvement in the characteristics of a power storage device.

Note that the material described in the above embodiment is used as a positive electrode active material.

A structure and a formation method of a negative electrode is described with reference to FIGS. 19A to 19C. As a structure of a power storage device, the structure illustrated in FIGS. 14A to 14C can be employed and the negative electrode here corresponds to the negative electrode 2211 illustrated in FIGS. 14A to 14C.

Figure 19A:
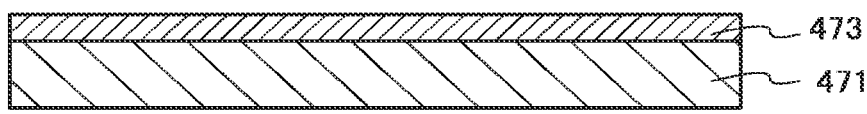
FIGS. 19A to 19C are diagrams illustrating an example of a method for forming a negative electrode.

An amorphous silicon layer 473 is formed over a negative electrode collector 471 (see FIG. 19A).

As the negative electrode collector 471, a conductive material such as titanium, nickel, copper, indium, tin, or silver is used.

The amorphous silicon layer 473 may be formed in a manner similar to that of the above-described amorphous silicon layer 413.

Figure 19B:
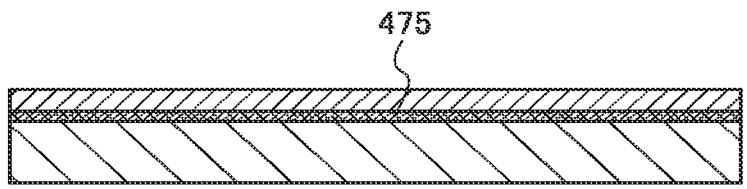
Figure 19C:
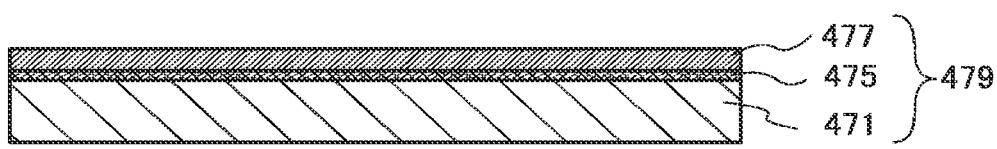

Then, a heat treatment is performed, so that a mixed layer 475 of the collector material and the active material is formed (see FIG. 19B).

For example, in the case where titanium is used as the negative electrode collector 471, a mixed layer of titanium and silicon is formed as the mixed layer 475. The mixed layer of titanium and silicon may be a titanium silicide layer.

A crystalline silicon layer serving as a negative electrode active material layer 477 may be formed by crystallizing the amorphous silicon layer 473 by this heat treatment. A negative electrode 479 in which the negative electrode collector 471, the mixed layer 475, and the negative electrode active material layer 477 are stacked is formed (see FIG. 19C).

Note that the heat treatment in FIG. 19B is performed for formation of the mixed layer 475. When the amorphous silicon layer 473 is not so highly crystallized and desired crystallinity is not obtained by this heat treatment, another heat treatment (which can be laser beam irradiation) for further crystallization may be performed. Further, amorphous silicon, microcrystalline silicon, or the like can be used as the negative electrode active material layer 477.

As described above, amorphous silicon, microcrystalline silicon, or crystalline silicon can be used as the negative electrode active material layer 477. A diffusion rate of lithium ions in crystalline silicon is higher than that in amorphous silicon, which can contribute to improvement in the characteristics of a power storage device; therefore, crystalline silicon is preferable.

Through the above steps, a negative electrode can be formed. In this embodiment, a mixture layer of a collector material and an active material is provided between a collector and an active material layer which are included in the negative electrode. Thus, the characteristics of an interface between the collector and the active material layer (adhesion, easiness of donation and reception of electrons, and the like) are improved, whereby the characteristics of a power storage device can be improved. Further, in a positive electrode, the material described in the above embodiment is used as a positive electrode active material; therefore, both the negative electrode and the positive electrode can contribute to improvement in the characteristics of the power storage device.

This embodiment can be combined with a structure of any of the other embodiments or the examples as appropriate.

Embodiment 9

In this embodiment, application of a power storage device according to one embodiment of the present invention is described.

The power storage device can be provided in a variety of electronic devices. For example, the power storage device can be provided in cameras such as digital cameras or video cameras, mobile phones, portable information terminals, e-book terminals, portable game machines, digital photo frames, audio reproducing devices, and the like. Moreover, the power storage device can be provided in electrically propelled vehicles such as electric vehicles, hybrid vehicles, electric railway cars, working vehicles, carts, wheel chairs, and bicycles.

The characteristics of a power storage device according to one embodiment of the present invention are improved; for example, higher capacitance and a higher charging and discharging rate are obtained. By improving the characteristics of the power storage device, the power storage device can be also compact and lightweight. When being provided with such a power storage device, electronic devices or electrically propelled vehicles can have a shorter charging time, a longer operating time, and reduced size and weight, and thus their convenience and design can be improved.

Figure 20A:
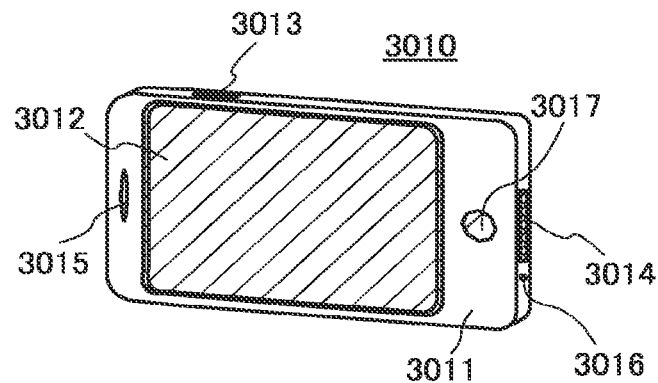
FIGS. 20A and 20B are diagrams each illustrating an example of an electronic device.

FIG. 20A illustrates an example of a mobile phone. In a mobile phone 3010, a display portion 3012 is incorporated in a housing 3011. The housing 3011 is provided with an operation button 3013, an operation button 3017, an external connection port 3014, a speaker 3015, a microphone 3016, and the like. When a power storage device according to one embodiment of the present invention is provided in such a mobile phone, the mobile phone can have improved convenience and design.

Figure 20B:
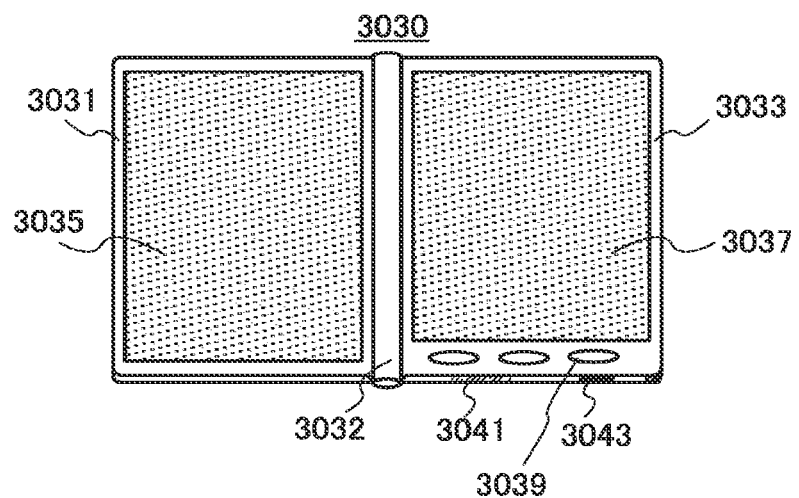

FIG. 20B illustrates an example of an e-book terminal. An e-book terminal 3030 includes two housings, a first housing 3031 and a second housing 3033, which are combined with each other with a hinge 3032. The first and second housings 3031 and 3033 can be opened and closed with the hinge 3032 as an axis. A first display portion 3035 and a second display portion 3037 are incorporated in the first housing 3031 and the second housing 3033, respectively. In addition, the second housing 3033 is provided with an operation button 3039, a power switch 3043, a speaker 3041, and the like. When a power storage device according to one embodiment of the present invention is provided in such an e-book terminal, the e-book terminal can have improved convenience and design.

Figure 21A:
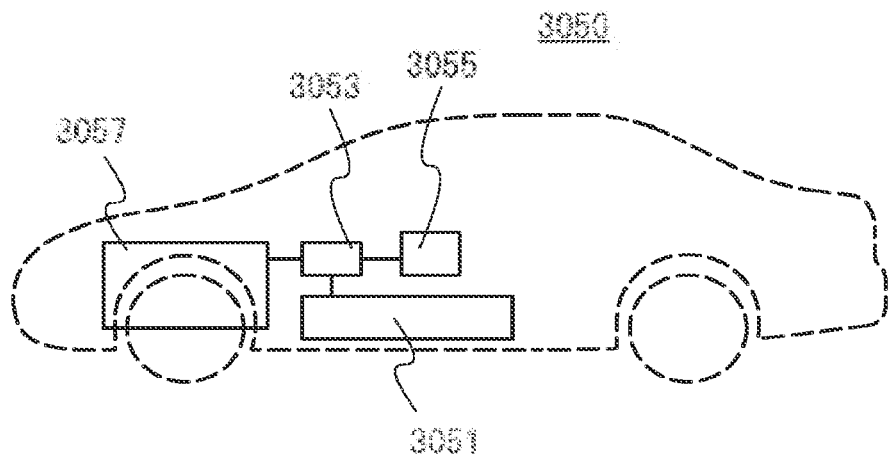
FIGS. 21A and 21B are diagrams each illustrating an example of an electrically propelled vehicle.

FIG. 21A illustrates an example of an electric vehicle. A power storage device 3051 is provided in an electric vehicle 3050. The electric power of the power storage device 3051 is controlled by a control circuit 3053 to be output and is supplied to a driving device 3057. The control circuit 3053 is controlled by a computer 3055.

The driving device 3057 includes a DC motor or an AC motor either alone or in combination with an internal-combustion engine. The computer 3055 outputs a control signal to the control circuit 3053 based on an input data such as data of operation acceleration, deceleration, or stop) by a driver or data during driving (e.g., data on an upgrade or a downgrade, or data on a load on a driving wheel) of the electric vehicle 3050. The control circuit 3053 adjusts the electric energy supplied from the power storage device 3051 in accordance with the control signal of the computer 3055 to control the output of the driving device 3057. In the case where the AC motor is mounted, an inverter which converts direct current into alternate current is incorporated.

Charging of the power storage device 3051 can be performed by supplying power from the external by a plug-in system. When a power storage device according to one embodiment of the present invention is provided as the power storage device 3051, a shorter charging time can be brought about and improved convenience can be realized. Besides, the higher charging and discharging rate of the power storage device can contribute to greater acceleration and excellent characteristics of the electric vehicle. Further, when the power storage device 3051 can be reduced in size and weight as a result of improvement in its characteristics, the vehicle can be reduced in weight and the fuel-efficiency can be improved.

Figure 21B:
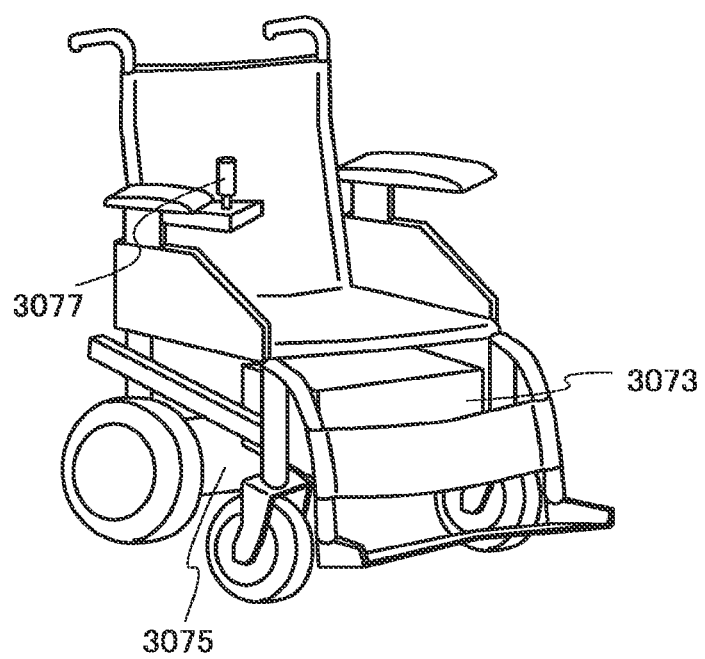

FIG. 21B illustrates an example of an electric wheelchair. A wheel chair 3070 includes a control portion 3073 which is provided with a power storage device, a power controller, a control means, and the like. The electric power of the power storage device is controlled by the control portion 3073 to be output and is supplied to a driving portion 3075. Further, the control portion 3073 is connected to a controller 3077. By operation of the controller 3077, the driving portion 3075 can be driven via the control portion 3073 and movement of the wheel chair 3070 such as moving forward/backward and a turn and speed can be controlled.

Charging of the power storage device of the wheel chair 3070 can also be performed by supplying power from the external by a plug-in system. When a power storage device according to one embodiment of the present invention is provided as the power storage device, a shorter charging time can be brought about and improved convenience can be realized. Further, when the power storage device can be reduced in size and weight as a result of improvement in its characteristics, the user and the wheelchair helper can use the wheel chair 3070 more easily.

Note that in the case where a power storage device is provided in electric railway cars as electrically propelled vehicles, charging of the power storage device can be performed by supplying power from overhead wires or conductive rails.

This embodiment can be combined with a structure of any of the other embodiments or the examples as appropriate.

Example 1

In this example, a specific manufacturing method of a power storage device where lithium iron phosphate is used as a positive electrode active material is described.

As raw materials of lithium iron phosphate, lithium carbonate ($Li_2CO_3$), iron oxalate ($FeC_2O_4$), and ammonium dihydrogen phosphate ($NH_4H_2PO_4$) were mixed by a first ball mill treatment.

Lithium carbonate was a raw material for introducing lithium; iron oxalate was a raw material for introducing iron; and ammonium dihydrogen phosphate was a raw material for introducing phosphoric acid.

The first ball mill treatment was performed in such a manner that acetone was added as a solvent and a ball mill with a ball diameter of Φ3 mm was rotated at 400 rpm for 2 hours.

After the first ball mill treatment, the mixture of the raw materials was shaped into pellets by applying pressure of $1.47 \times 10^2 N$ (150 kgf).

Next, the mixture which was shaped into pellets was subjected to first baking. The first baking was performed at 350° C. for 10 hours with the mixture placed in a nitrogen atmosphere.

After the first baking, the baked mixture was ground in a mortar.

After that, glucose was added to the ground mixture and a surface of the mixture was supported by a carbon material. The amount of glucose was varied within a range of from 5 wt % to 15 wt %.

The mixture to which glucose was added was subjected to a second ball mill treatment. The second ball mill treatment was performed in such a manner that acetone was added as a solvent, and a ball mill with a ball diameter of Φ3 mm was rotated at 400 rpm for 2 hours.

After the second ball mill treatment, the mixture was shaped into pellets again. Then, second baking was performed. In the second baking, the mixture was placed in a nitrogen atmosphere, and a temperature was varied within a range of from 400° C. 600° C. and baking time was varied within a range of from 3 hours to 10 hours.

After the second baking, the baked mixture was ground in a mortar.

Then, the ground mixture was subjected to a third ball mill treatment. The third ball mill treatment was performed in such a manner that acetone was added as a solvent, and a ball mill with a ball diameter of Φ3 mm was rotated at 300 rpm for 3 hours.

Through the above steps, lithium iron phosphate particles were obtained. The particles were mixed with a conductive agent, a binder, and a solvent, and were dispersed by using a homogenizer. The dispersed material was applied on a positive electrode collector and dried, whereby is positive electrode active material layer was obtained. Note that an aluminum foil was used as the positive electrode collector; acetylene black, the conductive agent; a polyvinylidene fluoride, the binder; and N-methyl-2-pyrrolidone (NMP), the solvent.

Pressure was applied to the dried material, and the shape of the dried material was fixed, whereby a positive electrode was formed. Pressure was applied with the use of a roll press so that a film thickness was about 50 m and the amount of the carbon material supporting lithium iron phosphate was about 3 mg/cm², and the positive electrode was subjected to punching so as to have a round shape with Φ12 mm, whereby a positive electrode of a lithium ion secondary battery was obtained.

A lithium foil was used as a negative electrode and polypropylene (PP) was used as a separator. An electrolyte solution in which a solute was lithium hexafluorophosphate ($LiPF_6$) and a solvent was ethylene carbonate (EC) and dimethyl carbonate (DC) was used. Note that the separator was impregnated with the electrolyte solution.

Through the above steps, a coin-type lithium ion secondary battery including the positive electrode, the negative electrode, the separator, and the electrolyte solution was obtained. Assembly of the positive electrode, the negative electrode, the separator, the electrolyte solution, and the like was performed in a glove box with an argon atmosphere.

Results of measurement of various kinds (a surface area, rate characteristics, an X-ray diffraction half width, and discharge capacity) and formation conditions of Samples A to G of the obtained lithium iron phosphate particles are shown in FIGS. 9A to 9C. Note that the rate characteristics are indicated by a percentage of discharge capacity in the case where a discharge rate is 10 C with respect to discharge capacity in the case where a discharge rate is 2 C at a discharge test (constant current drive/constant voltage drive (CCCV drive)). The rate characteristics indicate a charging and discharging rate. Further, the X-ray diffraction half width is a half width of an X-ray diffraction peak and indicates crystallinity. The surface area was measured by a BET method. Note that the discharge capacity was measured by a discharge test at a discharge rate of 0.2 C with CCCV drive.

In FIG. 9B, a relation between the surface area and the rate characteristics (which is plotted with ○ (white dots)) and a relation between the crystallinity and the rate characteristics (which is plotted with • (black dots)) are shown. The lower horizontal axis indicates a surface area ($m^2/g$); the upper horizontal axis, an X-ray diffraction half width (°); and the vertical axis, rate characteristics (%).

From FIG. 9B, it was confirmed that the rate characteristics improve as the surface area is increased. It is to be noted that the rate characteristics changed linearly (a solid line 601). The graph shows that the rate characteristics are favorable when the surface area is at least in a range of greater than or equal to 24 $m^2/g$ and less than or equal to 27.5 $m^2/g$.

In Sample A, although the surface, area was large, the rate characteristics were low. It can be considered that this resulted from the larger addition amount of glucose than the other samples and the crystallinity was reduced by adding such a large amount of glucose. In other words, it was confirmed that high rate characteristics can be obtained in the case where glucose is added at greater than or equal to 5 wt % and less than or equal to 10 wt % in the manufacturing method of Example 1.

The rate characteristics of Sample F and Sample G were much lower than those of the other samples. It can be considered that this resulted from the lower baking temperature than the other samples and the crystallinity was reduced by the low-temperature baking.

Further, from FIG. 9B, it was confirmed that the maximum value of the crystallinity (the X-ray diffraction half width) with respect to the rate characteristics exists (a dashed line 603). The graph shows that the rate characteristics are favorable when the X-ray diffraction half width is at least in a range of greater than or equal to 0.13° and less than 0.17°.

In FIG. 9C, a relation between the crystallinity and the discharge capacity is shown. It was confirmed that the discharge capacity is increased as the crystallinity is increased (i.e., as the X-ray diffraction half width is decreased). It is to be noted that the discharge capacity changed linearly (a solid line 605). The graph shows that the discharge capacity is high when the X-ray, diffraction half width is at least in a range of greater than or equal to 0.13° and less than or equal to 0.2°.

Note that, as seen from FIG. 9A, a power storage device with high rate characteristics and high discharge capacity could be obtained even with the baking time shortened.

This example can be implemented in combination with any of the other embodiments as appropriate.

Example 2

In this example, formation of lithium iron silicate as a lithium oxide and X-ray diffraction measurement results thereof are described.

First of all, a formation method of the treasured lithium iron silicate is described.

As raw materials of lithium iron silicate, lithium carbonate ($Li_2CO_3$), iron oxalate dihydrate ($FeC_2O_4 \cdot 2H_2O$), and a silicon oxide ($SiO_2$) were mixed by a first ball mill treatment.

The first ball mill treatment was performed in such a manner that acetone was added as a solvent, and a ball mill with a ball diameter of Φ3 mm was rotated at 400 rpm for 2 hours.

After the first ball mill treatment, the mixture of the raw materials was taken out of a pot and heated to 50° C. so that acetone was evaporated. Then, pressure of $1.47 \times 10^2 N$ (150 kgf) was applied to the mixture of the raw materials with the use of a pellet press for 5 minutes, so that the mixture of the raw materials was shaped into pellets.

Then, the mixture which was shaped into pellets was subjected to first baking (pre-baking). The first baking was performed in a nitrogen atmosphere at 350° C. for 10 hours.

After the first baking, the baked mixture was ground in a mortar.

After that, the ground mixture was mixed with glucose at 10 wt % of the mixture by a second ball mill treatment.

The second ball mill treatment was performed in such a manner that acetone was added as a solvent, and a ball mill with a hall diameter of Φ3 mm was rotated at 400 rpm for 2 hours.

After the second ball mill treatment, the mixture of the raw materials was taken out of a pot and heated to 50° C., so that acetone was evaporated. Then, pressure of $1.47 \times 10^2 N$ (150 kgf) was applied to the mixture ache raw materials with the use of a pellet press for 5 minutes, so that the mixture of the raw materials was shaped into pellets.

Then, the mixture which was shaped into pellets was subjected to second baking (also referred to as main baking). The second baking was performed in a nitrogen atmosphere at 700° C. for 10 hours.

Figure 22A:
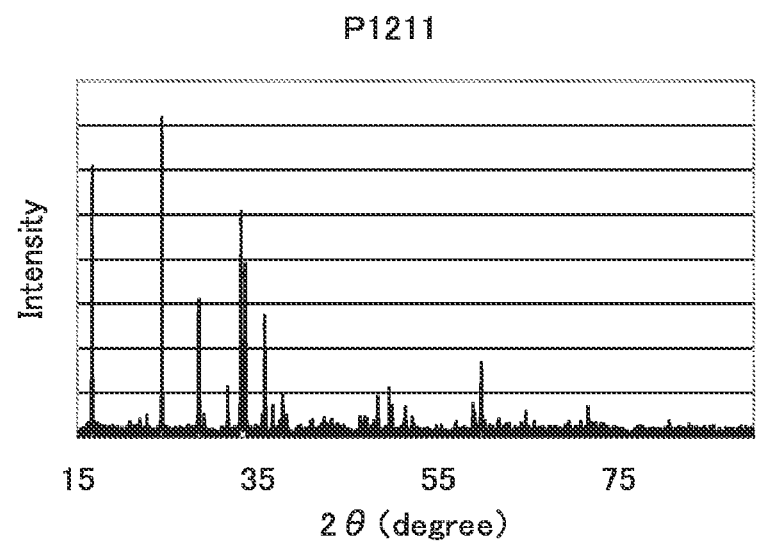
FIGS. 22A and 22B are graphs each showing a measurement result of X-ray diffraction.

X-ray diffraction (XRD) measurement was performed on the lithium iron silicate which was formed as described above. A measurement result of X-ray diffraction is shown in FIG. 22A. From the result shown in FIG. 22A, it was confirmed that the formed lithium iron silicate had a crystal structure belonging to the space group P1211.

Figure 22B:
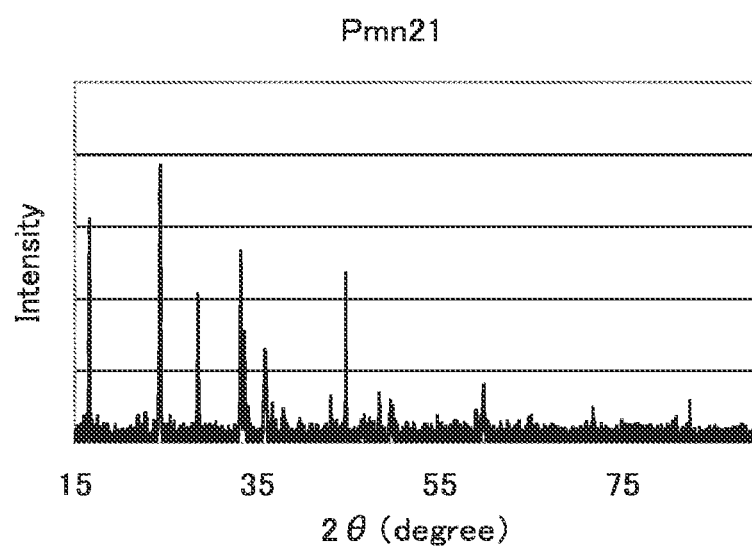

Further, a result of X-ray diffraction measurement performed on lithium iron silicate which was formed by the above-described formation method in which the baking temperature or the second baking was set to 800° C. is shown in FIG. 22B. From the result shown in FIG. 22B, it was confirmed that the formed lithium iron silicate had a crystal structure belonging to the space group Pmn21. Note that in the result shown in FIG. 22B, a peak which seems to be a peak of a simple substance of iron is observed. It can be assumed that this peak of a simple substance of iron resulted from iron which was contained in the raw material.

As described above, it was confirmed that either lithium iron silicate whose crystal structure belongs to the space group P1211 or lithium iron silicate whose crystal structure belongs to the space group Pmn21 can be formed. Moreover, it was confirmed that by changing the temperature of the second baking (main baking), a crystal structure to be formed can be selected from a crystal structure belonging to the space group P1211 and a crystal structure belonging, to the space group Pmn21.

This application is based on Japanese Patent Application serial no. 2010-104027 filed with Japan Patent Office on Apr. 28, 2010, Japanese Patent Application Serial No. 2010-103832 filed with Japan Patent Office on Apr. 28, 2010, and Japanese Patent Application Serial No. 2010-104082 filed with Japan Patent Office on Apr. 28, 2010, the entire contents of which are hereby incorporated by reference.

What is claimed is:

1. An active material particle,
wherein the active material particle comprises lithium iron phosphate,
wherein a grain size of the active material particle is greater than or equal to 10 nm and less than or equal to 100 nm, and
wherein an X-ray diffraction half width of the active material particle is greater than or equal to 0.13° and less than 0.16°.

2. An electrode comprising:
a current collector;
an active material layer over the current collector, the active material layer comprising:
the active material particle according to claim 1; and
a binder comprising a polymer.

3. A power storage device comprising:
a positive electrode comprising the active material particle according to claim 1;
a negative electrode; and
an electrolyte between the positive electrode and the negative electrode.

4. The power storage device according to claim 3,
wherein a rate characteristic of the power storage device is 0.85 or more,
wherein the rate characteristic is defined by a rate of a discharge capacity in a case where a discharge rate is 10 C with respect to a discharge capacity in a case where a discharge rate is 2 C, and
wherein discharging n times in an hour is expressed as n C.

5. An electrically propelled vehicle comprising the power storage device according to claim 3.

6. An active material particle comprising:
a region comprising lithium iron phosphate;
a carbon layer on a surface of the active material particle,
wherein the region comprising lithium iron phosphate comprises a crystal of lithium iron phosphate,
wherein a grain size of the active material particle is greater than or equal to 10 nm and less than or equal to 100 nm, and
wherein an X-ray diffraction half width of the crystal is greater than or equal to 0.13° and less than 0.16°.

7. An electrode comprising:
a current collector;
an active material layer over the current collector, the active material layer comprising:
the active material particle according to claim 6; and
a binder comprising polyvinylidene fluoride.

8. A power storage device comprising:
a positive electrode comprising the active material particle according to claim 6;
a negative electrode; and
an electrolyte between the positive electrode and the negative electrode.

9. The power storage device according to claim 8,
wherein a rate characteristic of the power storage device is 0.85 or more,
wherein the rate characteristic is defined by a rate of a discharge capacity in a case where a discharge rate is 10 C with respect to a discharge capacity in a case where a discharge rate is 2 C, and
wherein discharging n times in an hour is expressed as n C.

10. An electrically propelled vehicle comprising the power storage device according to claim 8.

* * * * *